(12) United States Patent
Wang et al.

(10) Patent No.: US 12,223,945 B2
(45) Date of Patent: Feb. 11, 2025

(54) SYSTEMS AND METHODS FOR MULTIPLE SPEAKER SPEECH RECOGNITION

(71) Applicant: HITHINK ROYALFLUSH INFORMATION NETWORK CO., LTD., Zhejiang (CN)

(72) Inventors: Jinlong Wang, Hangzhou (CN); Xinkang Xu, Hangzhou (CN); Xinhui Hu, Hangzhou (CN)

(73) Assignee: HITHINK ROYALFLUSH INFORMATION NETWORK CO., LTD., Hangzhou (CN)

( * ) Notice: Subject to any disclaimer, the term of this patent is extended or adjusted under 35 U.S.C. 154(b) by 222 days.

(21) Appl. No.: 17/660,407

(22) Filed: Apr. 23, 2022

(65) Prior Publication Data

US 2023/0115271 A1    Apr. 13, 2023

(30) Foreign Application Priority Data

Oct. 13, 2021  (CN) .......................... 202111190697.X
Oct. 29, 2021  (CN) .......................... 202111273417.1

(51) Int. Cl.
*G10L 15/04*   (2013.01)
*G10L 15/02*   (2006.01)
(Continued)

(52) U.S. Cl.
CPC .............. *G10L 15/04* (2013.01); *G10L 15/02* (2013.01); *G10L 15/08* (2013.01); *G10L 25/87* (2013.01)

(58) Field of Classification Search
None
See application file for complete search history.

(56) References Cited

U.S. PATENT DOCUMENTS 9,110,880 B1 *  8/2015  Strope ................... G10L 15/183
9,368,109 B2 *  6/2016  Colibro ................. G10L 15/063
(Continued)

FOREIGN PATENT DOCUMENTS

CN          1099165 A      2/1995
CN        105513589 A      4/2016
(Continued)

OTHER PUBLICATIONS

Jiang, Hui. "Confidence measure for speech recognition: A survey". Speech Communication 45 (2005) 455-470) (Year: 2005).*

*Primary Examiner* — Jesse S Pullias
(74) *Attorney, Agent, or Firm* — METIS IP LLC

(57) ABSTRACT

A speech recognition method is provided. The method may include: obtaining speech data and a speech recognition result of the speech data, the speech data including speech of a plurality of speakers, and the speech recognition result including a plurality of words; determining speaking time of each of the plurality of speakers by processing the speech data; determining, based on the speaking times of the plurality of speakers and the speech recognition result, a corresponding relationship between the plurality of words and the plurality of speakers; determining, based on the corresponding relationship, at least one conversion word from the plurality of words, each of the at least one conversion word corresponding to at least two of the plurality of speakers; and re-determining the corresponding relationship between the plurality of words and the plurality of speakers based on the at least one conversion word.

12 Claims, 11 Drawing Sheets

(51) Int. Cl.
*G10L 15/08* (2006.01)
*G10L 25/87* (2013.01)

(56) References Cited

U.S. PATENT DOCUMENTS

| | | | |
|---|---|---|---|
| 9,966,066 | B1 | 5/2018 | Corfield et al. |
| 10,366,693 | B2* | 7/2019 | Gorodetski ............. G10L 17/04 |
| 10,943,583 | B1 | 3/2021 | Gandhe et al. |
| 11,152,006 | B2* | 10/2021 | Krupka .................... G10L 17/08 |
| 11,636,860 | B2* | 4/2023 | Gorodetski ............. G10L 17/04 |
| | | | 704/244 |
| 11,670,304 | B2* | 6/2023 | Khoury .................. G10L 17/04 |
| | | | 704/246 |
| 2005/0049860 | A1* | 3/2005 | Junqua .................. H04M 1/271 |
| | | | 704/E15.04 |
| 2014/0142944 | A1 | 5/2014 | Ziv et al. |
| 2015/0025887 | A1* | 1/2015 | Sidi ........................ G10L 17/02 |
| | | | 704/245 |
| 2015/0279353 | A1* | 10/2015 | Itoh ........................ G10L 15/18 |
| | | | 704/243 |
| 2016/0217793 | A1 | 7/2016 | Gorodetski et al. |
| 2017/0125013 | A1 | 5/2017 | Yan |
| 2019/0392837 | A1* | 12/2019 | Jung ................... H04L 12/1831 |

FOREIGN PATENT DOCUMENTS

| | | |
|---|---|---|
| CN | 106782507 A | 5/2017 |
| CN | 108735200 A | 11/2018 |
| CN | 110390946 A | 10/2019 |
| CN | 110473527 A | 11/2019 |
| CN | 110491411 | 11/2019 |
| CN | 110853666 A | 2/2020 |
| CN | 110931013 A | 3/2020 |
| CN | 111009258 A | 4/2020 |
| CN | 111128223 | 5/2020 |
| CN | 111182162 A | 5/2020 |
| CN | 111243601 A | 6/2020 |
| CN | 112201275 A | 1/2021 |
| CN | 112289323 A | 1/2021 |
| CN | 112420069 A | 2/2021 |
| CN | 112466287 A | 3/2021 |
| CN | 112885336 A | 6/2021 |
| CN | 113192516 A | 7/2021 |
| CN | 113343831 A | 9/2021 |

* cited by examiner

SYSTEMS AND METHODS FOR MULTIPLE SPEAKER SPEECH RECOGNITION

CROSS-REFERENCE TO RELATED APPLICATIONS

This application claims priority to Chinese Patent Application No. 202111273417.1, filed on Oct. 29, 2021, and Chinese Patent Application No. 202111190697.X, filed on Oct. 13, 2021, the contents of each of which are incorporated herein by reference in their entirety.

TECHNICAL FIELD

The present disclosure relates to speech processing field, in particular, to a system and method for speech recognition.

BACKGROUND

Speech recognition technologies can be used to transcribe speech into words. It is widely used in many fields, such as computers, education, artificial intelligence, and so on. For example, when a speech to be transcribed includes a plurality of speakers, it is necessary to distinguish the speaker corresponding to each speech segment and determine the speech content of each of the plurality of speakers. However, speech content is often omitted or assigned to a wrong speaker by existing methods for speech recognition. On the other hand, in order to improve the accuracy of speech recognition, some technologies for speech recognition introduce re-scoring methods, but existing re-scoring technologies have some problems, such as a slow decoding speed and a large memory space required for decoding.

Therefore, it is necessary to provide a method and system for speech recognition, which may improve the accuracy and the efficiency of speech recognition.

SUMMARY

One aspect of the present disclosure may provide a speech recognition system. The speech recognition system may include at least one storage device storing a set of instructions; and at least one processor in communication with the at least one storage device, wherein when executing the set of instructions, the at least one processor is configured to cause the system to perform operations including: obtaining speech data and a speech recognition result of the speech data, the speech data including speech of a plurality of speakers, and the speech recognition result including a plurality of words; determining speaking time of each of the plurality of speakers by processing the speech data; determining, based on the speaking times of the plurality of speakers and the speech recognition result, a corresponding relationship between the plurality of words and the plurality of speakers; determining, based on the corresponding relationship, at least one conversion word from the plurality of words, each of the at least one conversion word corresponding to at least two of the plurality of speakers; and re-determining the corresponding relationship between the plurality of words and the plurality of speakers based on the at least one conversion word.

In some embodiments, the re-determining the corresponding relationship between the plurality of words and the plurality of speakers based on the at least one conversion word may include: for each of the at least one conversion word, determining a speaker corresponding to the conversion word based on a time interval between the conversion word and at least one adjacent word of the conversion word.

In some embodiments, the re-determining the corresponding relationship between the plurality of words and the plurality of speakers based on the at least one conversion word may include: obtaining voiceprint feature information of each of the plurality of speakers; and for each of the at least one conversion word, determining the speaker corresponding to the conversion word based on the voiceprint feature information of the plurality of speakers and voiceprint feature information of a target speech segment, the target speech segment including the conversion word.

In some embodiments, the determining speaking time of each of the plurality of speakers by processing the speech data may include: generating at least one effective speech segment including speech content by preprocessing the speech data; and determining the speaking time of each of the plurality of speakers by processing the at least one effective speech segment.

In some embodiments, the generating at least one effective speech segment including speech content by preprocessing the speech data may include: obtaining a plurality of first speech segments by processing the speech data based on the speech recognition result; obtaining a plurality of second speech segments by amplifying the plurality of first speech segments; and obtaining the at least one effective speech segment by performing a processing operation on the plurality of second speech segments, the processing operation including at least one of a merging operation or a segmentation operation.

In some embodiments, the determining the speaking time of each of the plurality of speakers by processing the at least one effective speech segment may include: extracting a voiceprint feature vector of each of the at least one effective speech segment; and determining the speaking time of each of the plurality of speakers by clustering the voiceprint feature vector of the at least one effective speech segment.

In some embodiments, to obtain the speech recognition result of the speech data, the at least one processor may be configured to cause the system to perform operations including: determining feature information of the speech data; determining, based on the feature information, a plurality of candidate speech recognition results and a confidence score of each of the plurality of candidate speech recognition results using a decoding model and a re-scoring model; and determining the speech recognition result from the plurality of candidate speech recognition results based on the confidence scores of the plurality of candidate speech recognition results.

In some embodiments, the determining, based on the feature information, a plurality of candidate speech recognition results and a confidence score of each of the plurality of candidate speech recognition results using a decoding model and a re-scoring model may include: obtaining the plurality of candidate speech recognition results and an initial confidence score of each of the plurality of candidate speech recognition results by processing the feature information using the decoding model; determining a correction value of each of the plurality of candidate speech recognition results using the re-scoring model; and for each of the plurality of candidate speech recognition results, determining the confidence score of the candidate speech recognition result based on the corresponding initial confidence score and the corresponding correction value.

In some embodiments, the re-scoring model may be generated based on a process of training model, the process of training model including: obtaining a first language model and a second language model, and the first language model being obtained by cropping the second language model; generating the decoding model based on the first language model; generating a first scoring model and a second scoring model based on the first language model and the second language model; and obtaining the re-scoring model based on the first scoring model and the second scoring model.

In some embodiments, the obtaining the re-scoring model based on the first scoring model and the second scoring model may include: obtaining a plurality of possible speech recognition results and a first confidence score of each of the plurality of possible speech recognition results by traversing the second scoring model; for each of the plurality of possible speech recognition results, determining a second confidence score of the possible speech recognition result based on the first scoring model; updating the second scoring model based on the first confidence scores and the second confidence scores of the plurality of possible speech recognition results; and determining the re-scoring model based on the updated second scoring model.

In some embodiments, the first scoring model may include a plurality of first arcs, the second scoring model may include a plurality of second arcs, and the each of the plurality of possible speech recognition results may be represented by a sequence of at least one second arc, and for each of the plurality of possible speech recognition results, the determining a second confidence score of the possible speech recognition result based on the first scoring model may include: for the each of the plurality of possible speech recognition results, determining, in the first scoring model, a sequence of at least one first arc corresponding to the sequence of at least one second arc of the possible speech recognition result; and determining the second confidence score of the possible speech recognition result based on the sequence of at least one first arc.

Another aspect of the present disclosure may provide a speech recognition method. The method may be implemented on a computing device having one or more processors and one or more storage device. The method may include: obtaining speech data and a speech recognition result of the speech data, the speech data including speech of a plurality of speakers, and the speech recognition result including a plurality of words; determining speaking time of each of the plurality of speakers by processing the speech data; determining, based on the speaking times of the plurality of speakers and the speech recognition result, a corresponding relationship between the plurality of words and the plurality of speakers; determining, based on the corresponding relationship, at least one conversion word from the plurality of words, each of the at least one conversion word corresponding to at least two of the plurality of speakers; and re-determining the corresponding relationship between the plurality of words and the plurality of speakers based on the at least one conversion word.

Another aspect of the present disclosure may provide a non-transitory computer readable medium. The non-transitory computer readable medium may include executable instructions that, when executed by at least one processor, directs the at least one processor to perform a speech recognition method, the method including: obtaining speech data and a speech recognition result of the speech data, the speech data including speech of a plurality of speakers, and the speech recognition result including a plurality of words; determining speaking time of each of the plurality of speakers by processing the speech data; determining, based on the speaking times of the plurality of speakers and the speech recognition result, a corresponding relationship between the plurality of words and the plurality of speakers; determining, based on the corresponding relationship, at least one conversion word from the plurality of words, each of the at least one conversion word corresponding to at least two of the plurality of speakers; and re-determining the corresponding relationship between the plurality of words and the plurality of speakers based on the at least one conversion word.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
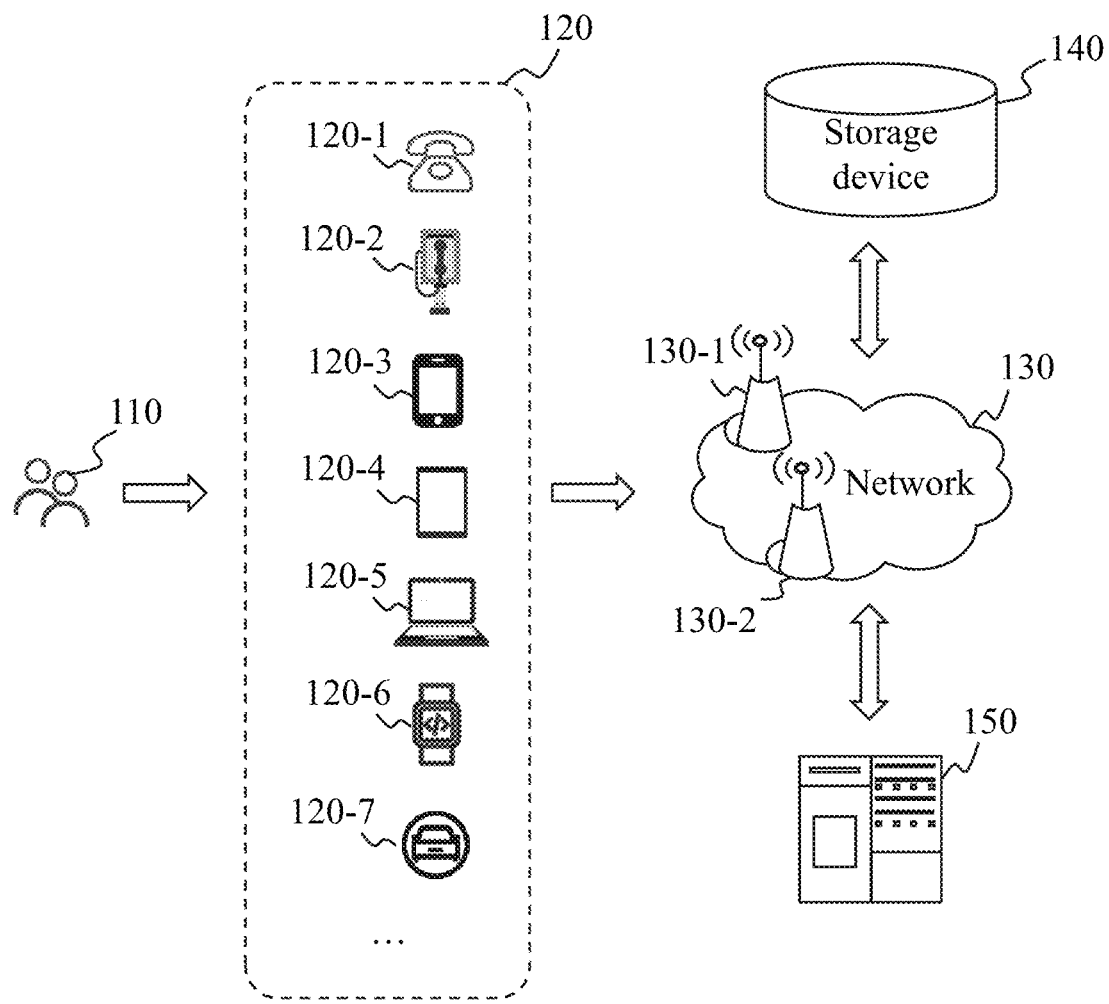
FIG. 1 is a schematic diagram illustrating exemplary application scenario of a speech recognition system according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

One aspect of the present disclosure may provide a method and a system for distinguishing speakers. In speech analysis, it is often necessary to use a technology for distinguishing speakers to determine speaking times and content of different speakers. In traditional methods, speech content is determined by speech recognition technology, the speaking times of different speakers is determined by the technology for distinguishing speakers, and then the corresponding speech content of a specific speaker is determined according to the speaking time of the specific speaker. However, the traditional methods barely use speech recognition results to improve the accuracy of distinguishing speakers, and a phenomenon that the speech content is omitted or distinguished to an incorrect speaker often happens.

The system for distinguishing speakers provided by the present disclosure may obtain speech data and a speech recognition result of the speech data. The speech data may include speech of a plurality of speakers, and the speech recognition result may include a plurality of words. The system for distinguishing speakers may process the speech data and determine speaking time of each of the plurality of speakers. The system for distinguishing speakers may further determine a corresponding relationship between the plurality of words in the speech recognition results and the plurality of speakers based on the speaking times of the plurality of speakers and the speech recognition result. The system for distinguishing speakers may also determine at least one conversion word from the plurality of words, and the conversion word may be a word corresponding to at least two speakers in the corresponding relationship. The system for distinguishing speakers may re-determining the corresponding relationship based on the at least one conversion word. The technology for distinguishing speakers in the present disclosure may use both the speech recognition technology and the voiceprint feature extraction technology, which may avoid the problem that speech content is often omitted or assigned to a wrong speaker in the speech recognition result and improve the accuracy and the efficiency of distinguishing speakers. By recognizing and re-determining the at least one conversion word in the speech recognition result, the accuracy and the reliability of the speech recognition may be improved.

Another aspect of the present disclosure may provide a method and a system for on-the-fly rescoring. In some embodiments, an on-the-fly rescoring technique may be used to determine the speech recognition result of the speech data. A decoding model, such as HCLG.fst model, is commonly used in existing speech recognition technologies to determine the speech recognition result of the speech data. The decoding model may have a directed graph structure. Generally, the larger the decoding model is (i.e., the more nodes and arcs the decoding model has), the better the effect of speech recognition is. However, using a large decoding model may require more computational memory and slow down a decoding speed.

In order to improve the accuracy of decoding without reducing the decoding speed, the on-the-fly rescoring is proposed. The on-the-fly rescoring may use two language models LM1 and LM2. The volume of LM1 may be smaller than the volume of LM2. LM1 may be used to generate a decoding model HCLG.fst, and LM1 and LM2 may be used together to generate another decoding model F.fst. When using HCLG.fst to decode, an F.fst network may be used to re-score the speech recognition result in real-time to improve the accuracy of recognition. In traditional on-the-fly rescoring techniques, the re-scoring model F.fst is a WFST network that may be "built in real-time as needed". A weight of an arc in the re-scoring model F.fst may be determined by two WFST networks G1.fst and G2.fst in real time, wherein G1.fst may be generated based on LM1, and G2.fst may be generated based on LM2. After the decoding model is used to decode and determine a certain search path (i.e., an ordered set of arcs, which will be described in detail in the following description), the re-scoring model F.fst may be generated by searching G1.fst and G2.fst. Then a score of the certain search path may be determined based on the generated decoding model F.fst. The traditional on-the-fly rescoring techniques have a slow decoding speed. On the other hand, when decoding using the traditional on-the-fly rescoring techniques, G1.fst, G2.fst, and F.fst may need to be loaded at the same time, and a state set may need to be reserved on each search path, which may need to occupy a large memory space. Therefore, it is necessary to provide an effective on-the-fly rescoring method to improve the efficiency of speech recognition and reduce the computing resources used in speech recognition.

The system for on-the-fly rescoring provided by the present disclosure may obtain feature information of the speech data. The system for on-the-fly rescoring may obtain a plurality of candidate speech recognition results and a confidence score of each of the plurality of candidate speech recognition results using the decoding model and a re-scoring model based on the feature information. Further, the system for on-the-fly rescoring may determine the speech recognition result from the plurality of candidate speech recognition results based on the confidence scores of the plurality of candidate speech recognition results. By using the re-scoring model to re-score the candidate speech recognition results of the decoding model, the analysis and calculation required for language decoding may be reduced, and then the computing resources required for speech decoding may be reduced.

FIG. 1 is a schematic diagram illustrating an exemplary application scenario of a speech recognition system according to some embodiments of the present disclosure. In some embodiments, an application scenario of a speech recognition system 100 may include one or more speakers 110, a speech device 120, a network 130, a storage device 140, and a processing device 150.

In some embodiments, the speech recognition system 100 may analyze speech recorded by the one or more speakers 110 using the speech device 120 to transcribe the speech into text. The one or more speakers 110 may include one or more persons, such as a customer service and a customer in a customer service telephone recording, and a plurality of participants in a meeting recording. In some embodiments, the speech may include a speech segment of a certain length of time, such as 1 minute, half an hour, etc. In some embodiments, the speech may be a file in any format, such as MP3, WAV, FLC, etc. In some embodiments, the speech recognition system 100 may analyze the speech of the one or more speakers 110 to determine the speech content of each speaker. In some embodiments, the speech recognition system 100 may apply a re-scoring model to speech recognition to improve the accuracy of the speech recognition result.

The speech device 120 may be a device having a function of sound acquisition. In some embodiments, the speech device 120 may be a device having a call function. For example, the speech device 120 may include a personal phone 120-1, a public phone 120-2, a mobile device 120-3, a tablet 120-4, a laptop 120-5, a wearable device 120-6, an on-board device 120-7, or any combination thereof. In some embodiments, the mobile device 120-3 may include a smart home device, a smart mobile device, a virtual reality device, an augmented reality device, or any combination thereof. The smart mobile device may include a smart phone, a personal digital assistant (PDA), a game device, a navigation device, a point of sale (POS) device, or the like, or any combination thereof. The virtual reality device or the augmented reality device may include a virtual reality helmet, virtual reality glasses, a virtual reality goggle, an augmented reality helmet, augmented reality glasses, an augmented reality goggle, or the like, or any combination thereof. In some embodiments, the wearable device 120-6 may include a smart bracelet, smart shoes and socks, smart glasses, a smart helmet, a smart watch, smart clothing, a smart backpack, smart accessories, or the like, or any combination thereof. In some embodiments, the on-board device 120-7 may include an on-board computer, an on-board television, or the like.

The network 130 may facilitate an exchange of information and/or data. In some embodiments, one or more components in the speech recognition system 100 (e.g., the speech device 120, the storage device 140, and the processing device 150) may send information and/or data to other component(s) in the speech recognition system 100 via the network 130. For example, the processing device 150 may obtain data related to telephone conversations from the speech device 120 and/or the storage device 140 via the network 130.

In some embodiments, the network 130 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth™ network, a ZigBee network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, mobile communication (1G, 2G, 3G, 4G, 5G) network, Wi-Fi, Li-Fi, narrow band Internet of Thing (NB-IoT), or the like, or any combination thereof.

In some embodiments, the network 130 may include one or more network access points. For example, the network 130 may include wired or wireless network access points (such as base stations and/or internet exchange points 130-1, 130-2, . . . ), through which one or more components of the speech recognition system 100 may be connected to the network 130 to exchange data and/or information.

In some embodiments, the storage device 140 may store data and/or instructions. In some embodiments, the storage device 140 may store data/information obtained from components such as the speech device 120 and/or the processing device 150. In some embodiments, the storage device 140 may store data and/or instructions executed or invoked by the processing device 150 to complete the exemplary methods described in the present disclosure.

In some embodiments, the storage device 140 may include a mass storage device, a removable storage device, a random access memory (RAM), a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. The ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more other components (e.g., the speech device 120, or the processing device 150) of the speech recognition system 100. The one or more components of the speech recognition system 100 may access data or instructions stored in the storage device 140 via the network 130. In some embodiments, the storage device 140 may be directly connected or communicated with the one or more components in the speech recognition system 100 (e.g., the speech device 120, or the processing device 150). In some embodiments, the storage device 140 may be a part of the speech device 120, or a part of the processing device 150. In some embodiments, the storage device 140 may be integrated into the speech device 120.

In some embodiments, the processing device 150 may process data and/or information obtained from the speech device 120 and/or the storage device 140. In some embodiments, the processing device 150 may be a single server or a server cluster. The server cluster may be centralized or distributed (for example, the processing device 150 may be a distributed system). In some embodiments, the processing device 150 may be local or remote. For example, the processing device 150 may access information and/or data stored in the speech device 120 and/or the storage device 140 via the network 130. For another example, the processing device 150 may be directly connected to the speech device 120 and/or the storage device 140 to access the stored information and/or data. In some embodiments, the processing device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the processing device 150 may include one or more processing devices (e.g., single-core processing engine(s) or multi-core processor(s)). Merely by way of example, the processing device 150 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 150 may be integrated into the speech device 120.

It should be noted that above description about the speech recognition system is merely provided for the convenience of description, and is not intended to limit the scope of the present disclosure. It could be understood that for those skilled in the art, after understanding the principle of the system, it is possible to arbitrarily combine various components, or form subcomponents to connect with other components without departing from this principle.

Figure 2A:
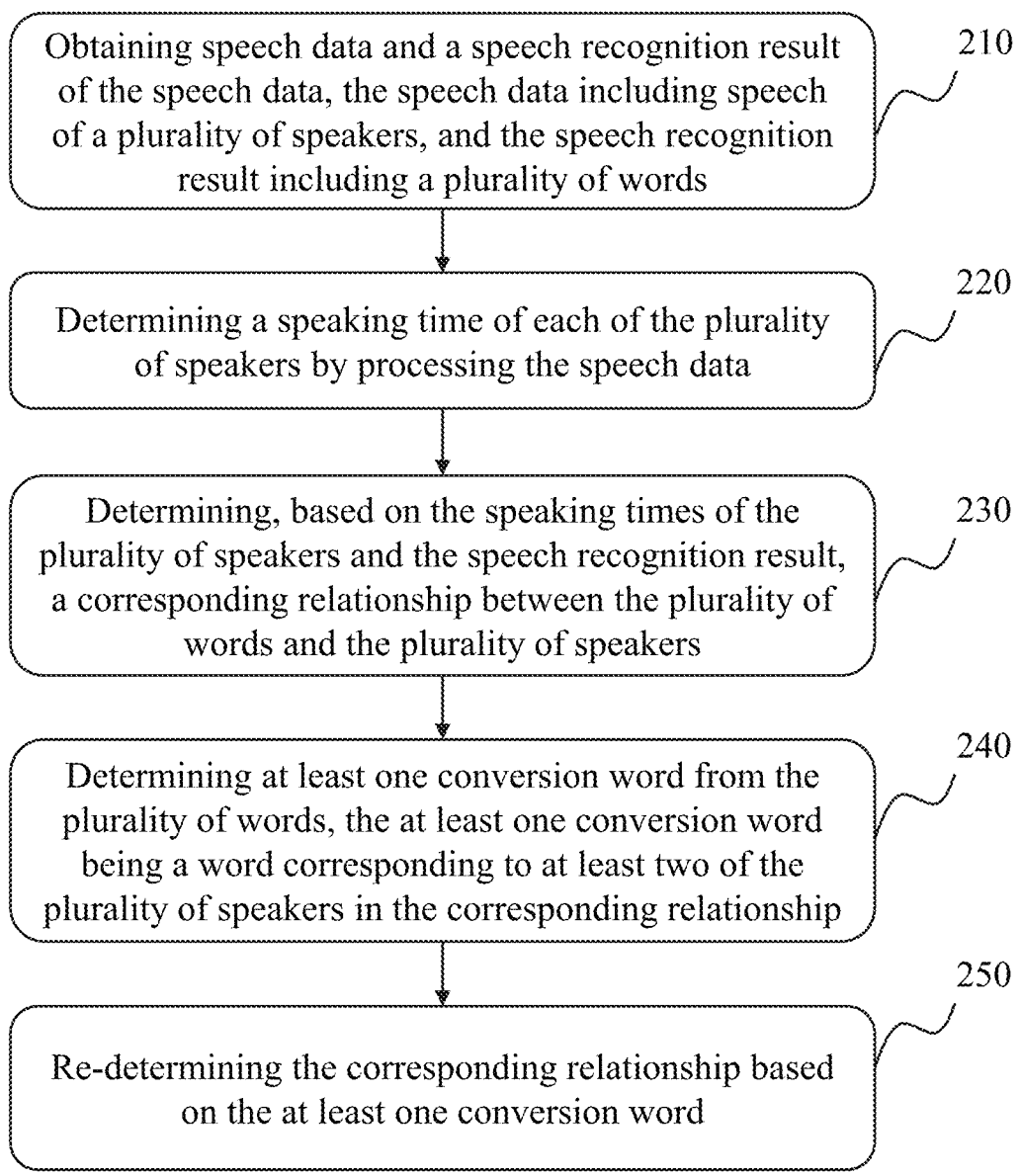
FIG. 2A is a flowchart illustrating an exemplary method for speech recognition according to some embodiments of the present disclosure.

FIG. 2A is a flowchart illustrating an exemplary method for speech recognition according to some embodiments of the present disclosure. As shown in FIG. 2A, a process 200A may include the following operations. In some embodiments, the process 200A may be implemented by a processing device (e.g., the processing device 150). For example, the process 200A shown in FIG. 2A may be stored in the storage device 140 in a form of instructions, and invoked and/or implemented by the processing device 150.

In 210, the processing device may obtain speech data and a speech recognition result of the speech data.

In some embodiments, the operation 210 may be performed by an acquisition module 1010.

The speech data may include speech of a plurality of speakers, and the speech of the plurality of speakers may need to be processed to determine speech content of each speaker (e.g., presented in a form of text). For example, the speech data may be a telephone recording of communication between a customer service and a customer. For another example, the speech data may be a meeting recording when a plurality of participants have a meeting. In some embodiments, the speech data may be recorded through one or more speech devices (e.g., a speech device 120). In some embodiments, the speech data may be stored in a variety of different formats, such as lossless formats (WAV, FLAC, APE, ALAC, WavPack, or the like) or lossy formats (MP3, AAC, Ogg Vorbis, Opus, or the like). Parameters (such as the audio file format, the sampling bit width, the sound channel, the sampling rate, the duration, etc.) of the speech data in the present disclosure may not be limited herein.

In some embodiments, when a speech device is recording the speech data, the speech device may sample an audio voltage in a fixed time interval and store a sampled result in a storage device (e.g., a storage device 140) with a preset resolution (e.g., 16 bits or 2 bytes per sample in CDDA). The processing device may obtain the speech data by reading data from the storage device.

The speech recognition result of the speech data may include a plurality of words, that is, text content corresponding to the speech data. In some embodiments, the speech recognition result may include time information corresponding to each word. As an example, FIG. 2B may show a speech recognition result of a speech data 200B. The speech recognition result may include nine words "我们," "都," "爱," "吃," "西红柿," "是," "一个," "不错的," and "水果" (we all love eating tomato is a great fruit), and a start time, an end time, and/or a duration of each word in the speech data (not shown in FIG. 2B).

In some embodiments, the processing device may perform a semantic analysis operation on the speech data (e.g., language recognition, feature extraction, retrieval, matching, context semantic analysis, etc.) to obtain a text corresponding to the speech data. In some embodiments, the processing device may process the speech data speech recognition result using a speech recognition model to obtain the speech recognition result. Specifically, the processing device may input a speech file into the speech recognition model, the speech recognition model may perform a speech recognition processing operation on the speech file and output the word information and time information of the speech file.

In some embodiments, the speech recognition model may be a model for processing natural language. For example, the speech recognition model may include a neural network model, such as a recurrent neural networks (RNN) model, a long short term memory (LSTM) model, an N-Gram language model, or the like. In some embodiments, the speech recognition model may be trained by a plurality of labeled training samples. For example, a training sample may include a sample speech file and a label of the sample speech file. The label may represent word information and time information of the sample speech file. The label may be generated based on historical speech files in a database or be manually marked. A plurality of labeled training samples may be input into an initial speech recognition model, a value of a loss function may be determined based on an output result of the initial speech recognition model and the labels, and parameters of the initial speech recognition model may be updated iteratively based on the value of the loss function. When the initial speech recognition model meets a preset condition, the training of the initial speech recognition model may be completed, and the speech recognition model may be obtained. The preset condition may be that, for example, the loss function converges, a count of iterations reaches a threshold, or the like. In some embodiments, the speech recognition model may be generated by the processing device of the speech recognition system 100, or another processing device (e.g., a processing device of a supplier of the speech recognition system).

In some embodiments, the processing device may determine the speech recognition result of the speech data using a decoding model and a re-scoring model. Detailed description about the obtaining of the speech recognition result may refer to be found elsewhere in the present disclosure (e.g., FIG. 4 and related descriptions), which may not be repeated herein.

In 220, the processing device may process the speech data to determine a speaking time of each of the plurality of speakers. In some embodiments, the operation 220 may be implemented by a determination module 1020.

The speaking time of a speaker may refer to a time corresponding to the speaker's voice in the speech data, for example, a start time, an end time, and/or a duration. For example, in the speech data, a speaker A has three speech segments, and the corresponding speaking time is 00:00:10-00:00:15, 00:10:00-00:10:20, and 00:20:30-00:25:00.

Figure 3:
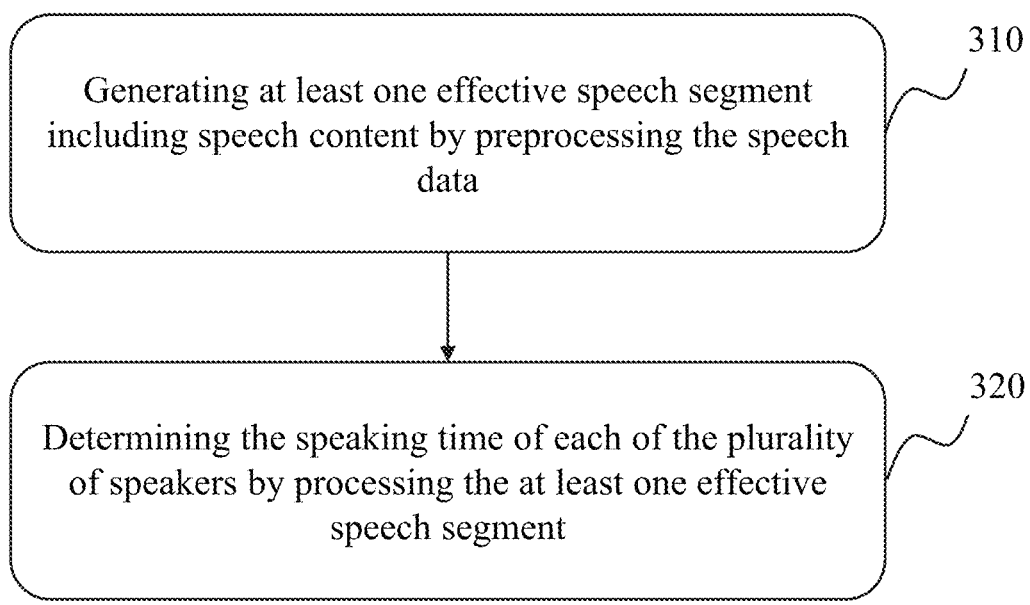
FIG. 3 is a flowchart illustrating an exemplary method for speaking time of each of a plurality of speakers according to some embodiments of the present disclosure.

In some embodiments, the processing device may determine the speaking time of each of the plurality of speakers by implementing a process 300 shown in FIG. 3.

In operation 310, the processing device may preprocess the speech data to generate at least one effective speech segment including speech content. In some embodiments, the operation 310 may be implemented by the determination module 1020. In some embodiments, a preprocessing operation of the speech data may include speech denoising, speech frame merging, speech frame elimination, speech frame amplification, or the like, or any combination thereof.

In some embodiments, an effective speech segment may refer to a speech segment including speech content. In some embodiments, the effective speech segment may refer to a voice segment without a mute segment and/or a noise segment. The mute segment may refer to a speech segment without speech content, for example, the mute segment may refer to a low-frequency segment with a frequency lower than 2 KHz. The noise segment may refer to a speech segment including noise, for example, the noise segment may refer to a high-frequency segment with a frequency higher than 4 kHz. The present disclosure may not limit the frequency of the mute segment or the noise segment.

In some embodiments, the processing device may process the speech data based on the speech recognition result to obtain a plurality of first speech segments. A first speech segment may refer to a speech segment confirmed to include speech content by a speech recognition operation. As described above, the speech recognition result may include the plurality of words and the time information (such as the start time and the end time). The processing device may determine a plurality of speech segments including content in the speech data as the plurality of first speech segments according to the time information of the plurality of words. In this process, speech segments without speech content in the speech data (for example, the noise segments and/or the mute segments) may be omitted.

Further, the processing device may amplify the plurality of first speech segments to obtain a plurality of second speech segments. For example, an amplified speech frame technique may be applied to a spectrogram (a visual representation of an audio waveform) of the plurality of first speech segments. The amplified speech frame technique may be used to perform a frame expansion processing on the left and right of speech frames of a frame according to a preset count of frames. In some embodiments, amplifying the plurality of first speech segments may increase the count of speech segments, so as to generate more speech data for subsequent speech recognition and improve the accuracy of speech recognition.

The processing device may perform at least one of a merging operation or a segmentation operation on the plurality of second speech segments to obtain the at least one effective speech segment. For example, the processing device may perform at least one of the merging operation or the segmentation operation on the plurality of second speech segments based on a preset processing threshold. For example, the preset processing threshold may be related to a time interval between two adjacent second speech segments. Merely by way of example, if the time interval between the two adjacent second speech segments is less than the preset processing threshold, the two adjacent second speech segments may be combined to obtain a single effective speech segment. For another example, if the time interval between the two adjacent second speech segments is greater than the preset processing threshold, the two adjacent second speech segments may be regarded as two effective speech segments, respectively, that is, two effective speech segments may be obtained. As another example, the preset processing threshold may be related to a duration of the second speech segment. Merely by way of example, if the duration of a second speech segment is less than the preset processing threshold, the second speech segment may be combined with another second speech segment before and after the second speech segment. As another example, if the duration of the second speech segment is greater than the preset processing threshold, the second speech segment may be divided into a plurality of effective speech segments. In some embodiments, different effective speech segments may have the same time length or different time lengths. In some embodiments, an effective speech segment may also be referred to as an effective speech frame.

By processing the speech data with the operation of speech denoising, speech frame merging, speech frame elimination or speech frame amplification, effective speech segments may be obtained effectively, and the accuracy of distinguishing speakers performed based on the effective speech segments may be improved.

In 320, the at least one effective speech segment may be processed to determine speaking times of the plurality of speakers. In some embodiments, the operation 320 may be implemented by the determination module 1020.

In some embodiments, the processing device may extract a voiceprint feature vector of each effective speech segment. The processing device may further determine the speaking times of the plurality of speakers by clustering the voiceprint feature vector(s) of at least one effective speech segment.

The voiceprint feature vector of an effective speech segment may include values of one or more voiceprint feature parameters, such as the sound quality, the sound length, the sound intensity, the pitch, the Mel frequency cepstrum coefficient (MFCC), the linear prediction coefficient (LPC), the linear prediction cepstrum coefficient (LPCC), or the like. Since each of the plurality of speaker's voice may have a unique voiceprint feature, the voiceprint feature vector of each effective speech segment may be used to determine a speaker corresponding to the effective speech segment.

In some embodiments, the processing device may extract the voiceprint feature vector of an effective speech segment using a voiceprint feature extraction model. Specifically, the effective speech segment may be input into the voiceprint feature extraction model. The voiceprint feature extraction model may recognize and extract a voiceprint feature of the effective speech segment, and output the voiceprint feature vector of the effective speech segment. In some embodiments, the voiceprint feature extraction model may refer to any model used to extract the voiceprint feature vector in the speech segment, which may not be limited in the present disclosure. For example, the voiceprint feature extraction model may include, but may not be limited to, an I-vector model, or an X-vector model.

In some embodiments, the processing device may use the voiceprint feature extraction model to extract a vector having a preset length based on a preset period, and designate the vector as the voiceprint feature vector of the effective speech segment. For example, the voiceprint feature extraction model may extract a vector having a length of 256 bits every 1.5 seconds from the effective speech segment as the voiceprint feature vector of the effective speech segment. In some embodiments, two adjacent sampling regions of the voiceprint feature extraction model may overlap each other for half a period (i.e., half a sampling region, such as 0.75 seconds). In some embodiments, when the duration of the effective speech segment is greater than the preset period (e.g., greater than 1.5 seconds), the voiceprint feature extraction model may sample the effective speech segment multiple times and output a plurality of voiceprint feature vectors. The processing device may determine an average value of the plurality of voiceprint feature vectors as the voiceprint feature vector of the effective speech segment.

Figure 2B:
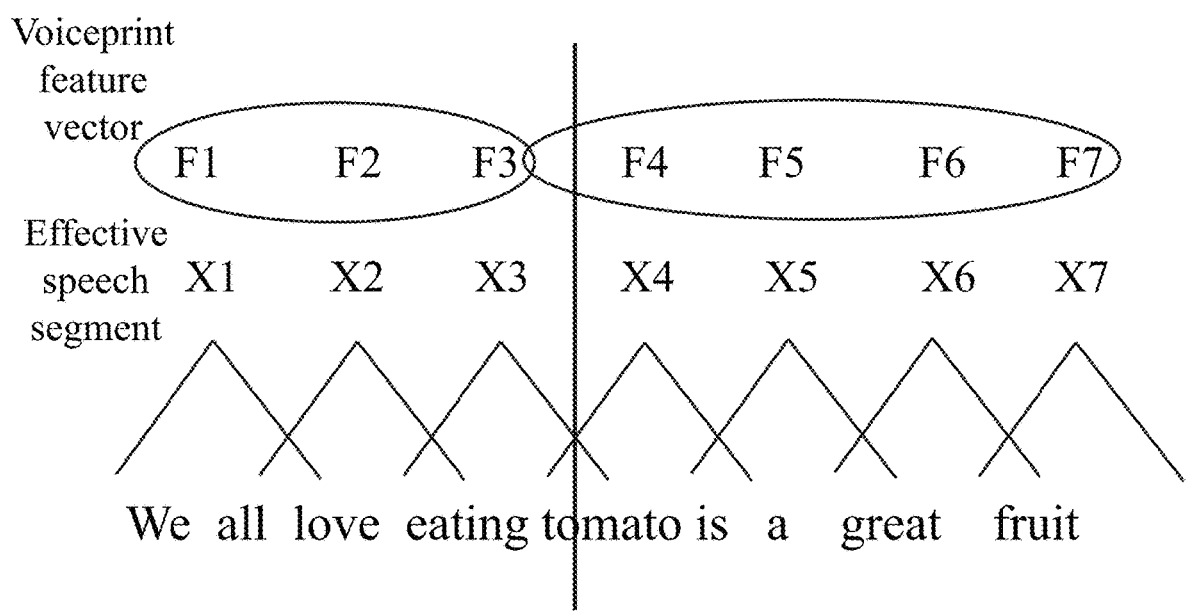
FIG. 2B is a schematic diagram illustrating an exemplary speech recognition result according to some embodiments of the present disclosure.

After the voiceprint feature vector(s) of the at least one effective speech segment is determined, the processing device may cluster the voiceprint feature vector(s) and determine the speaking times of the plurality speakers based on the clustering result. By clustering the voiceprint feature vector(s), voiceprint feature vectors with high similarity (e.g., higher than a certain similarity threshold) may be classified into one class, and voiceprint feature vectors classified into one class may be considered as corresponding to the same speaker. For example, as shown in FIG. 2B, there are seven effective speech segments X1-X7 of the speech data 200B, and the corresponding voiceprint feature vectors are denoted as F1-F7. The voiceprint feature vectors F1, F2, and F3 may be classified into a first cluster, and the voiceprint feature vectors F4, F5, F6, and F7 may be classified into a second cluster by clustering. Accordingly, the processing device may determine that the speech data may have two speakers, a first speaker corresponding to the voiceprint feature vectors F1, F2, and F3, and a second speaker corresponding to the voiceprint feature vectors F4, F5, F6, and F7. Since the effective speech segment corresponding to each voiceprint feature vector is known, the speaking time of each speaker may be determined based on the clustering result. For example, assuming that the times of the effective speech segments X1, X2, and X3 are 00:00:00-00:00:15, 00:00:10-00:00:25, and 00:00:20-00:00:35, respectively, the speaking time of the first speaker may be 00:00:00 to 00:00:35. Assuming that the times of the effective speech segments X4, X5, X6, and X7 is 00:00:30-00:00:45, 00:00:40-00:00:55, 00:00:50-00:01:05, and 00:01:00-00:01:15, respectively, the speaking time of the second speaker may be 00:00:30 to 00:01:15.

In some embodiments, the processing device may determine a plurality of clustering centers and voiceprint feature vectors corresponding to the plurality of clustering centers. A voiceprint feature vector corresponding to a cluster center of a cluster may be used as a base voiceprint feature vector of a category, that is, the voiceprint feature vector corresponding to the cluster center of the cluster may be used as a base voiceprint feature vector of a speaker corresponding to the cluster. For example, the voiceprint feature vectors F1, F2, and F3 in the first cluster may be averaged to obtain the base voiceprint feature vector of the first speaker corresponding to the first cluster. In some embodiments, the processing device may perform unsupervised clustering on the plurality of voiceprint feature vectors based on the similarity between the plurality of voiceprint feature vectors to obtain the clustering centers. The similarity between the plurality of voiceprint feature vectors may be measured by indicators, such as a Euclidean distance, a cosine similarity, or the like. In some embodiments, the processing device may classify the plurality of voiceprint feature vectors using a method other than clustering. For example, the processing device may classify the plurality of voiceprint feature vectors using a trained voiceprint feature vector classification model.

In some embodiments, the operation 310 may be omitted. The speaking times of the plurality of speakers may be determined directly by processing the speech data based on the processing device. For example, the processing device may divide the speech data into a plurality of speech segments, each of the plurality of speech segments may have a fixed time length (e.g., 1.5 seconds) and adjacent speech segments may have a certain overlap (e.g., 0.5 seconds). The processing device may determine a voiceprint feature vector of each of the plurality of speech segments, and determine the speaking time of each of the plurality of speakers by clustering the voiceprint feature vectors.

In 230, the processing device may determine a corresponding relationship between the plurality of words in the speech data and the plurality of speakers based on the speaking times of the plurality of speakers and the speech recognition result. In some embodiments, the operation 230 may be implemented by the determination module 1020.

As described above, time information of each of the plurality of words in the speech recognition result may be determined in the operation 210, and the speaking time of each of the plurality of speakers may be determined in the operation 220. The processing device may traverse the plurality of words in the speech recognition result based on the speaking times of the plurality of speakers, and determine the speakers corresponding to the plurality of words in the text of the speech data, to obtain the corresponding relationship between the plurality of words and the plurality of speakers. For example, as shown in FIG. 2B, the speaking time of the first speaker is from 00:00:00 to 00:00:35. The words appearing in this time period include "我们都爱吃西红柿" ("we all love eating tomato"), then the processing device may determine that "我们都爱吃西红柿" corresponds to the first speaker. The second speaker's speaking time is from 00:00:30 to 00:01:15. If the words "柿是一个不错的水果" ("to is a good fruit") appear in this time period, the processing device may determine that "柿是一个不错的水果" corresponds to the second speaker.

In 240, the processing device may determine at least one conversion word from the plurality of words. In some embodiments, the operation 240 may be implemented by the determination module 1020.

In some embodiments, a conversion word may refer to a word corresponding to at least two speakers in the corresponding relationship. For example, as shown in FIG. 2B, since there may be an overlap between adjacent effective speech segments, the word "西红柿" ("tomato") may be divided into two segments X3 and X4, and correspond to both the first speaker and the second speaker, thus the word "西红柿" may be determined as a conversion word. In some embodiments, the at least one conversion word may usually appear when the speaker changes or two or more speakers speak at the same time. For example, when a time interval between the conversions of two speakers is short (e.g., shorter than a certain time threshold) or the plurality of speakers are speaking at the same time, a word may correspond two or more speakers at the same time. In such cases, the speaker corresponding to the at least one conversion word may have some uncertainty. The speaker corresponding to the at least one conversion word may be redetermined to improve the accuracy of speech recognition.

In some embodiments, a time point corresponding to a conversion word may be regarded as a conversion point. The conversion point may connect the voiceprint feature vectors of two different people, that is, the voiceprint feature vectors before and after the conversion point may correspond to different speakers. For example, as shown in FIG. 2B, the effective speech segments X1, X2, and X3 may correspond to the first speaker, and the effective speech segments X4, X5, X6, and X7 may correspond to the second speaker. A middle position of X3 and X4 may be a conversion point, and the voiceprint feature vectors of the effective speech segments before and after the conversion point may correspond to different speakers.

In 250, the processing device may re-determine the corresponding relationship based on at least one conversion word. In some embodiments, the operation 250 may be implemented by a re-determination module 1030.

In some embodiments, the processing device may re-determine a speaker corresponding to the at least one conversion word. If the speaker corresponding to the at least one conversion word changes, the processing device may update the corresponding relationship.

In some embodiments, for each of the at least one conversion word, the processing device may determine the speaker corresponding to the conversion word based on a time interval between the conversion word and at least one adjacent word of the conversion word.

In some embodiments, the at least one adjacent word may refer to a word adjacent to the conversion word in the speech recognition result. The at least one adjacent word may include a former adjacent word and/or a latter adjacent word. The former adjacent word may refer to an adjacent word before the conversion word, and the latter adjacent word may refer to an adjacent word after the conversion word. For example, a former adjacent word of the conversion word "西红柿" ("tomato") in FIG. 2B may be "吃" ("eat"), and a latter adjacent word may be "是" ("is").

In some embodiments, the processing device may determine a target adjacent word from at least one adjacent word of the conversion word. A time interval between the target adjacent word and the conversion word may meet a first preset condition, and the target adjacent word may meet a second preset condition. For example, the first preset condition may be that the time interval between the adjacent word and the conversion words is less than a preset length of time (such as 1 second, 500 milliseconds, etc.). The second preset condition may mean that the adjacent word is not the conversion word (that is, the adjacent word may correspond to only one speaker). If there is only one target adjacent word, the processing device may designate the speaker corresponding to the target adjacent word as the speaker of the conversion word. Merely by way of example, the conversion word in the speech data 200B is "西红柿" ("tomato"). If a time interval between "西红柿" and the former adjacent word "吃" ("eat") is less than the preset length of time, "吃" is not a conversion word, and a time interval between "西红柿" and the latter adjacent word "是" ("is") is greater than the preset length of time, the processing device may take the speaker corresponding to "吃" as the speaker of "西红柿"

In some embodiments, if there are a plurality of target adjacent words, the processing device may select one of the plurality of target adjacent words as a final target adjacent word. For example, supposing that the former adjacent word "吃" and the latter adjacent word "吃" of "西红柿" are both target adjacent words, the processing device may select the target adjacent word with the shortest time interval from "吃" and "是" as the final target adjacent word. As another example, the processing device may determine the speaker of "西红柿" based on the time proportion of "西红柿" in the plurality of effective speech segments. Merely by way of example, if more portion of the word "西红柿" appears in X3 than X4, the processing device may determine that the Word "西红柿" corresponds to the first speaker.

By analyzing the adjacent word(s) of the conversion word, the speaker corresponding to the conversion word may be determined quickly and automatically, which may improve the efficiency of distinguishing speakers.

In some embodiments, if there is no target adjacent word satisfying both the first preset condition and the second preset condition, the processing device may obtain voiceprint feature information of the plurality of speakers, and determine the speaker corresponding to the conversion word based on the voiceprint feature information of the speakers and the voiceprint feature information of a target speech segment. The target speech segment may refer to a speech segment including the conversion word. In some embodiments, a speaker's voiceprint feature information may be represented by the speaker's base voiceprint feature vector. The base voiceprint feature vector may be determined based on the clustering result described in step 320. In some embodiments, the voiceprint feature information of a speaker may be pre-collected or pre-determined.

Specifically, the voiceprint feature information of the plurality of speakers may be compared with the voiceprint feature information of the target speech segment to select a target speaker. The voiceprint feature information of the target speaker may be most similar to the voiceprint feature information of the target speech segment. For example, the voiceprint feature information of the first speaker and the second speaker is represented by a base voiceprint feature vector X and a base voiceprint feature vector Y, respectively. The voiceprint feature information of the target speech segment is represented by the voiceprint feature vector Z. The processing device may select a voiceprint feature vector most similar to the voiceprint feature vector Z from the base voiceprint feature vectors X and Y, and take the speaker corresponding to the selected voiceprint feature vector as the speaker of the conversion word.

In some embodiments, the processing device may directly determine the speaker corresponding to the conversion word based on the voiceprint feature information of the plurality of speakers and the voiceprint feature information of the target speech segment corresponding to the conversion word without determining the target adjacent word. Thus, the operations for determining the speaker of the conversion word may be simplified and the efficiency of distinguishing speakers may be improved.

It should be noted that the above description of the process 200A is only for example and illustration, and should not limit the scope of the present disclosure. For persons having ordinary skills in the art, various modifications and changes may be made to process 200A under the teaching of the present disclosure, but these modifications and changes are still within the scope of the present disclosure.

Figure 4:
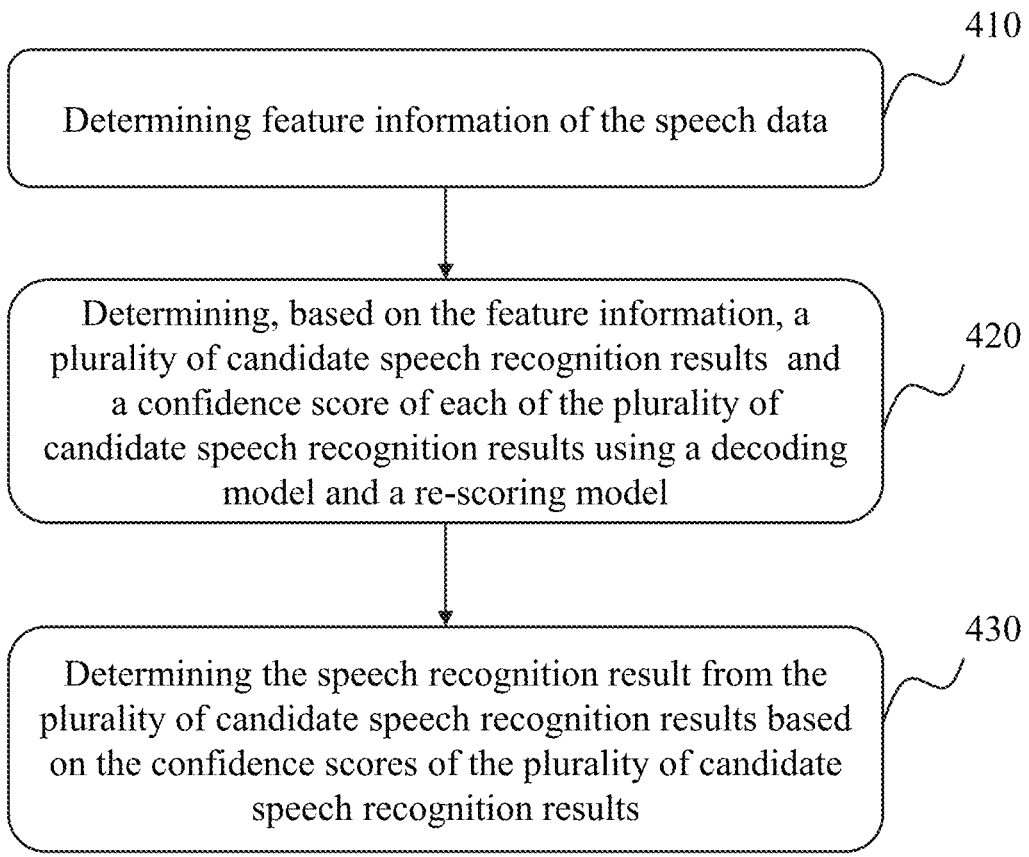
FIG. 4 is a flowchart illustrating an exemplary method for obtaining a speech recognition result of speech data according to some embodiments of the present disclosure.

FIG. 4 is a flowchart illustrating an exemplary method for obtaining a speech recognition result of speech data according to some embodiments of the present disclosure. As shown in FIG. 4, a process 400 may include the following operations. In some embodiments, the process 400 may be implemented by a processing device (e.g., the processing device 150). In some embodiments, the process 400 may be performed to achieve at least a portion of operation 210 as described in connection with FIG. 2.

In 410, the processing device may determine feature information of the speech data. In some embodiments, the operation 410 may be implemented by the determination module 1020.

In some embodiments, the feature information may include values of one or more voiceprint feature parameters of the speech data, such as the sound intensity, the sound height, or the like. In some embodiments, the feature information may include information related to phonemes or vowels included in the speech data, such as a probability that each phoneme or vowel is included in each speech frame of the speech data. In some embodiments, the processing device may obtain the feature information of the speech data in a variety of ways and generate a feature vector or a feature matrix representing the feature information.

In some embodiments, the processing device may use an acoustic model to determine the probability that each phoneme or vowel is included in each speech frame of the speech data as the feature information of the speech data. The acoustic model may include any model capable of determining the probability that each phoneme or vowel is included in each speech frame of the speech data, which may not be limited in the present disclosure. For example, the acoustic model may be a Gaussian mixture model, a hidden Markov model, a neural network model, or the like.

Specifically, the processing device may divide the speech data into several speech frames. The processing device may determine a spectral feature of each speech frame (e.g., a Fbank feature, a Mel cepstrum coefficient) and generate a feature sequence of the speech data. The feature sequence may include the spectral feature of each speech frame. Then, the processing device may determine the probability that each phoneme or vowel is included in each speech frame using the acoustic model based on the feature sequence. Assuming that there are M phonemes in total and the speech data is divided into N speech frames, the feature information of the speech data may be represented as an M*N feature matrix. Each row of the feature matrix may correspond to a feature vector of a speech frame, and each column may correspond to one phoneme. Each element in the matrix may represent a probability that a specific phoneme is included in a speech frame, and a sum of probabilities of all phonemes in each speech frame is 1 (that is, a sum of values in each row of the feature matrix is 1).

In 420, the processing device may determine a plurality of candidate speech recognition results and a confidence score of each of the plurality of candidate speech recognition results using a decoding model and a re-scoring model based on the feature information. In some embodiments, the operation 420 may be implemented by the determination module 1020.

In some embodiments, the plurality of candidate speech recognition results may refer to a plurality of possible recognition results determined after a speech recognition operation is performed on the speech data, each candidate speech recognition result may include one or more words. The confidence score of a candidate speech recognition result may represent the reliability and/or accuracy of the candidate speech recognition result. For example, the higher the confidence score is, the higher a possibility that the candidate speech recognition result accurately represents the speech content of the speech data is, that is, the higher the accuracy is. In some embodiments, the confidence score of the candidate speech recognition result may be represented as a percentage, a score, or the like.

In some embodiments, the decoding model may refer to a model capable of determining a word sequence corresponding to the speech data based on the feature information of the speech data. A processing process on the feature information of the speech data by the decoding model may also be referred to as a decoding process. In some embodiments, the decoding model may determine a plurality of possible word sequences corresponding to the speech data and an initial confidence score of each of the plurality of word sequences based on the feature information of the speech data. In some embodiments, the decoding model may be an HCLG model, which is generated after a combination of a hidden Markov model (HMM model, a kind of acoustic model), a context model, a lexicon model (a kind of pronunciation dictionary model), and a grammar model. In some embodiments, the re-scoring model may be a weighted finite-state transducer (WFST).

In some embodiments, the decoding model may have a directed graph structure. The directed graph structure may include a plurality of arcs and nodes, and the nodes may represent states. Each arc may connect with two nodes (i.e., two states), indicating a conversion of states. An arc may have an input, an output, and a weight, wherein the input may include an ID of a conversion between phonemes, and the output may be a result of a speech recognition operation (e.g., Chinese characters or words). When the output of an arc is 0, there may be no candidate speech recognition result. When the output of the arc is not 0, the output of the arc may correspond to a speech recognition result. The weight may represent a probability of converting from one node connected by the arc to another node (that is, the possibility of converting from one state to another state). In some embodiments, an arc sequence may represent a word sequence. The weight of arcs in the arc sequence may be used to score the arc sequence (i.e., determining the confidence score of the speech recognition result corresponding to the arc sequence). In some embodiments, an arc may also be referred to as a conversion state.

In some embodiments, the processing device may input the feature matrix and/or the feature vector of the speech data into the decoding model to obtain the plurality of candidate speech recognition results and an initial confidence score of each of the plurality of candidate speech recognition results. In some embodiments, the candidate speech recognition result may be represented as an ordered set of a plurality of arcs in the decoding model, and the ordered set of the plurality of arcs may reflect an ordered set of words, for example, "今天是星期·" ("today is Monday") and "我是张三" ("I am Zhang San"). In some embodiments, an arc sequence may reflect an order of the entire process of speech recognition. For example, the arc sequence may reflect an order of words recognized in the process of speech recognition. The initial confidence score of a candidate speech recognition result may be determined based on the weights of a set of arcs corresponding to the candidate recognition result. For example, the initial confidence score of the candidate speech recognition result may be a sum of the weights of the corresponding arcs.

The re-scoring model may refer to a pre-generated model for re-scoring a speech recognition result (i.e., re-determining the confidence score of the speech recognition result). For example, the re-scoring model may be used to re-determine the confidence score of a candidate speech recognition result generated by the decoding model. In some embodiments, the re-scoring model may include a pre-stored confidence score and/or a correct value of the confidence score. Merely by way of example, the re-scoring model may have a directed graph structure similar to the decoding model, and the weights of arcs of the re-scoring model may be used to determine the confidence score or a correction value of a confidence score of a word sequence represented by an arc sequence. In some embodiments, the re-scoring model may be a weighted finite-state transducer (WFST). In some embodiments, the re-scoring model may be generated based on a process of training model as described in FIG. 5.

In some embodiments, the processing device may process the feature information using the decoding model to obtain the plurality of candidate speech recognition results and the initial confidence score of each of the plurality of candidate speech recognition results. The processing device may use the re-scoring model to determine the correction value of each of the plurality of candidate speech recognition results. For example, as described above, a candidate speech recognition result may be represented as an ordered set of the plurality of arcs (or referred to as an arc sequence) in the decoding model, and the initial confidence score may be determined based on the weights of the plurality of arcs. For each candidate speech recognition result, the processing device may determine an arc sequence corresponding to the candidate speech recognition result from the plurality of arcs of the re-scoring model, and determine the correction value of the candidate recognition result based on the corresponding arc sequence. Further, for each candidate speech recognition result, the processing device may determine a corrected confidence score of the candidate speech recognition result based on the corresponding initial confidence score and correction value. Merely by way of example, the processing device may obtain the corrected confidence score by summing the initial confidence score and the correction value to correct the initial confidence score of the candidate speech recognition result of the decoding model in real time. For example, assuming that an initial confidence score of a candidate speech recognition result is 0.5 and the correction value is −0.03, the processing device may determine that the corrected confidence score is 0.47. In some embodiments, the process of determining the corresponding arc sequence of a candidate speech recognition result in the re-scoring model may be similar to the process of determining the corresponding arc sequence of a possible speech recognition result in a first scoring model. In some embodiments, in the process of generating the re-scoring model, a corresponding relationship between arcs (or arc sequences) in the first scoring model and arcs (or arc sequences) in the second scoring model (i.e., the possible speech recognition result) may be determined. The processing device may determine the corresponding arc sequence of the candidate speech recognition result in the re-scoring model based on the corresponding relationship.

In some embodiments, the process of using the decoding model to determine the candidate speech recognition results and the corresponding initial confidence scores may be implemented almost simultaneously with the process of using the re-scoring model to determine the correction values of the candidate speech recognition results. For example, in decoding, every time an arc sequence of the decoding model is determined by the processing device, a corresponding arc sequence and a weight of the corresponding arc sequence in the re-scoring model may be determined. After a candidate speech recognition result and the corresponding initial confidence score (i.e., an arc sequence of a decoding model and the weight of the arc sequence) are determined using the decoding model, the processing device may determine the correction value of the candidate speech recognition result based on the determined weight of the corresponding arc sequence. In this way, real-time re-scoring of candidate speech recognition results may be realized.

In 430, the processing device may determine the speech recognition result from the plurality of candidate speech recognition results based on the confidence scores of the plurality of candidate speech recognition results. In some embodiments, the operation 430 may be implemented by the determination module 1020.

In some embodiments, the speech recognition result may refer to a candidate speech recognition result with the highest confidence score. For example, in two candidate speech recognition results with confidence scores of 80% and 90%, respectively, the candidate speech recognition result with the confidence score of 90% may be determined as the speech recognition result. For another example, in three candidate speech recognition results with confidence scores of 0.8, 0.85 and 0.78, respectively, the candidate speech recognition result with the confidence score of 0.85 may be determined as the speech recognition result.

As described elsewhere in the present disclosure, in traditional on-the-fly rescoring techniques, path searching and weight determination may need to be performed in both G1.fst and G2.fst, and a re-scoring model F.fst needs to be generated in real-time, which occupies a large memory space and results in a slow decoding speed. In some embodiments of the present disclosure, the candidate speech recognition results of the decoding model may be rescored by the predetermined re-scoring model. In other words, only a single re-scoring model may need to be loaded during rescoring, which may reduce the count of decoding models and save intermediate variables, and reduce the resource occupation during decoding. On the other hand, the re-scoring model may store the correction value of confidence scores or corrected confidence scores of possible speech recognition results. The re-scoring techniques of the preset disclosure may be performed by directly searching the re-scoring model without calculation or with a simple calculation, which may improve the decoding speed.

It should be noted that the above description of the process 400 is only for example and illustration, and should not limit the scope of the present disclosure. For persons having ordinary skills in the art, various modifications and changes may be made to process 400 under the teaching of the present disclosure, but these modifications and changes are still within the scope of the present disclosure. For example, the process 400 may include one or more other operations, or one or more operations described above may be removed. For another example, the order of operations in the process 400 may be adjusted.

Figure 5:
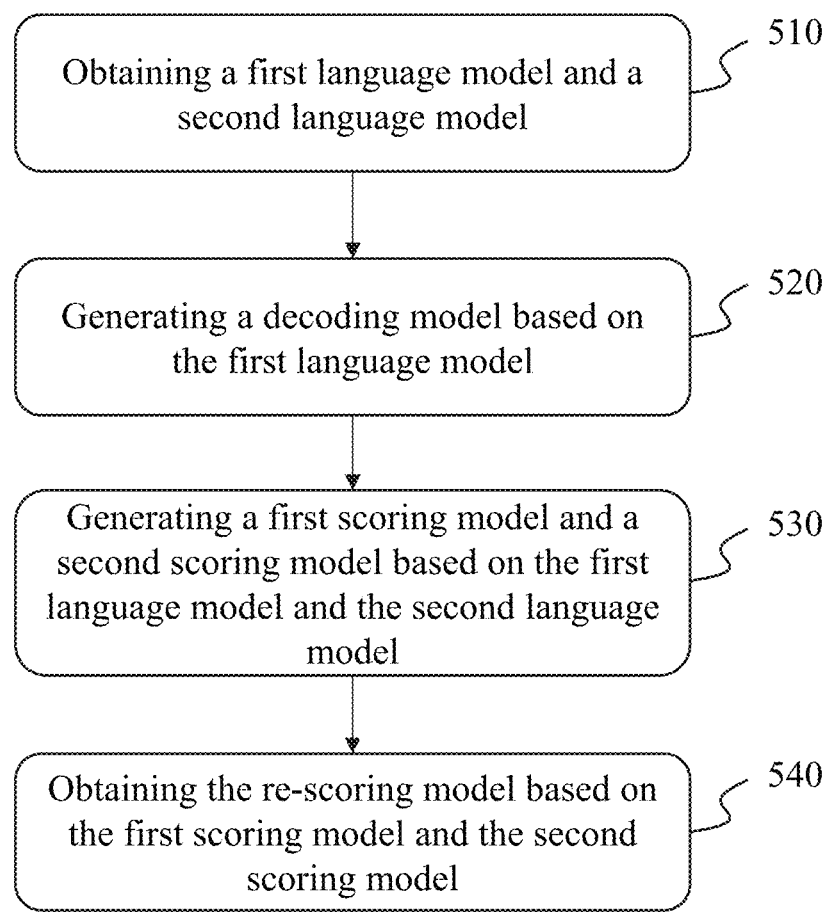
FIG. 5 is a flowchart illustrating an exemplary method for generating a re-scoring model according to some embodiments of the present disclosure.

FIG. 5 is a flowchart illustrating an exemplary method for generating a re-scoring model according to some embodiments of the present disclosure. As shown in FIG. 5, a process 500 may include the following operations. In some embodiments, the process 500 may be implemented by a processing device (e.g., the processing device 150). In some embodiments, the process 400 and the process 500 may be implemented by the same processing device or different processing devices. For example, both processes 400 and 500 may be implemented by the processing device 150. As another example, the process 400 may be implemented by the processing device 150, and the process 500 may be implemented by another processing device (e.g., a processing device of a supplier of the re-scoring model).

In 510, the processing device may obtain a first language model and a second language model. In some embodiments, the operation 510 may be implemented by a model generation module 1040.

A language model may be used to determine a degree of consistency between a word sequence and language expression habits. For example, an input of a language model may be a sequence including words and/or phrases, and an output of the language model may be the probability indicating a degree of consistency between the sequence and language expression habits. A low probability output by the language model may indicate that the sequence is not used frequently in language expression, and the sequence should be discarded in the process of language recognition.

In some embodiments, the first language model and the second language model may be language models in Arpa format. In some embodiments, the first language model and the second language model may be obtained in a variety of ways. For example, the processing device may train an initial language model to obtain the second language model. In some embodiments, ways of training the initial language model may include a supervised learning, or the like. Specifically, a training sample may include a word sequence and a corresponding probability that the word sequence is used in language expression.

In some embodiments, the first language model may be obtained by cropping the second language model. That is, the first language model may be a portion of the second language model. In some embodiments, the second language model may have a directed graph structure. The processing device may limit counts of states (i.e., nodes) and arcs, and crop a portion from the second language model as the first language model. As another example, the processing device may delete states and arcs whose weights are lower than a certain threshold (i.e., some unimportant states and arcs), and take the remaining states and arcs as the first language model.

In 520, the processing device may generate the decoding model based on the first language model. In some embodiments, the operation 520 may be implemented by the model generation module 1040.

In some embodiments, the decoding model may be an HCLG model. The processing device may combine the first language model with an acoustic model, a context model, and a pronunciation dictionary model to generate a decoding model.

In 530, the processing device may generate a first scoring model and a second scoring model based on the first language model and the second language model. In some embodiments, the operation 530 may be implemented by the model generation module 1040.

A scoring model may refer to a model used to score a speech recognition result (e.g., determine the confidence score of the speech recognition result). In some embodiments, the processing device may convert the first language model into a first finite-state transducer, convert the second language model into a second finite-state transducer, and designate the first finite-state transducer and the second finite-state transducer as the first scoring model and the second scoring model, respectively. In some embodiments, the first scoring model and the second scoring model may be weighted finite-state transducers with directed graph structures. The first scoring model may include a plurality of first nodes and a plurality of first arcs connecting with the plurality of first nodes. Each first arc may have a first weight. The second scoring model may include a plurality of second nodes and a plurality of second arcs connecting with the plurality of second nodes. Each second arc may have a second weight. The weights of arcs in the first scoring model and the second scoring model may be used to score the output of arcs (i.e., a speech recognition result). In some embodiments, as described above, the first language model may be a portion of the second language model, and the first scoring model may also be a portion of the second scoring model. That is, a first node and a first arc in the first scoring model may find the same node and arc in the second scoring model.

In some embodiments, a scale of the first scoring model and a scale of the second scoring model may be limited. A scale of a model may be measured by the count of nodes and/or arcs of the model. For example, the scale of the first scoring model and the scale of the second scoring model are not equal. In some embodiments, the scale of the first scoring model may be smaller than the scale of the second scoring model.

In 540, the processing device may obtain the re-scoring model based on the first scoring model and the second scoring model. In some embodiments, the operation 540 may be implemented by the model generation module 1040.

Figure 6:
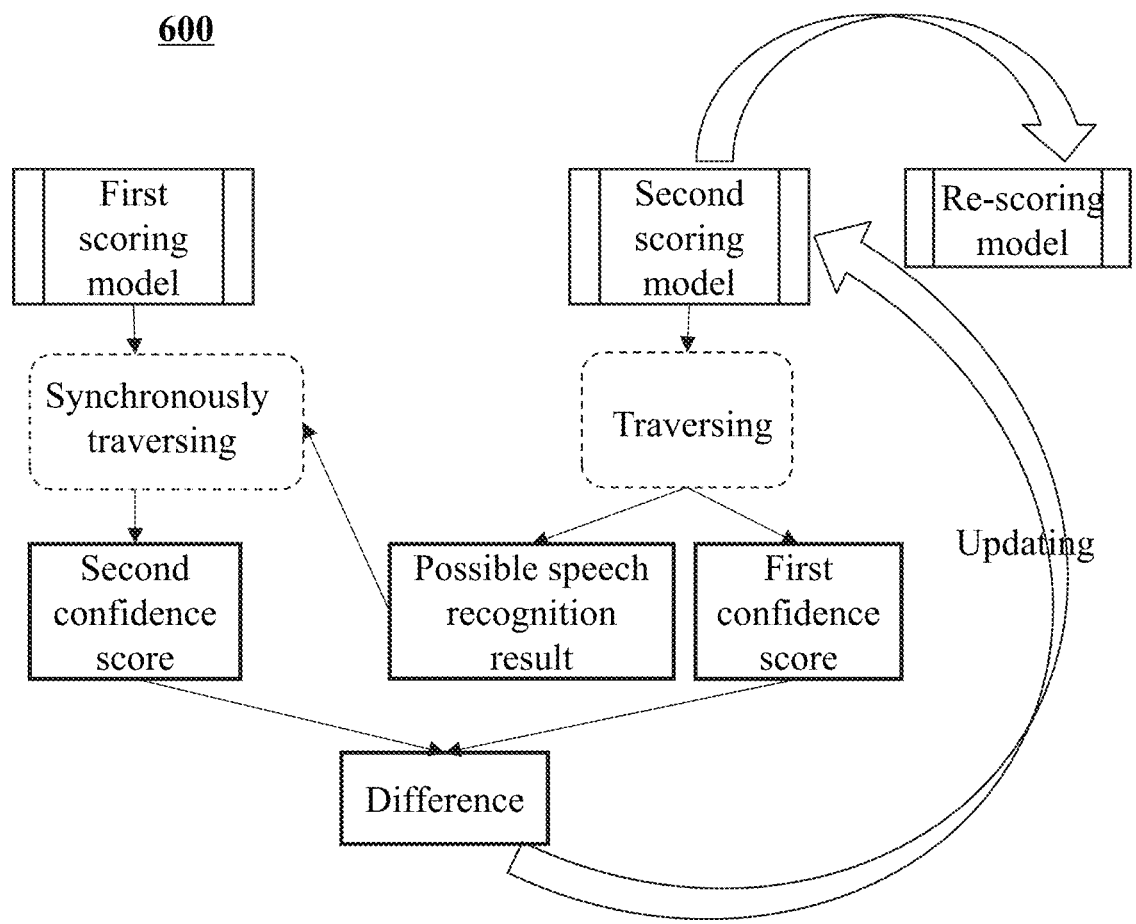
FIG. 6 is another flowchart illustrating an exemplary method for generating a re-scoring model according to some embodiments of the present disclosure.

In some embodiments, the processing device may implement the operation 540 using the method for generating the re-scoring model as shown in FIG. 6.

As shown in FIG. 6, the processing device may obtain a plurality of possible speech recognition results and a first confidence score of each of the plurality of possible speech recognition results by traversing the second scoring model. Traversing the second scoring model may refer to accessing the second nodes and the second arcs of the second scoring model to obtain all possible sequences of second arcs of the second scoring model. A possible sequence of second arcs may represent a possible speech recognition result, and weights of the second arcs in the possible sequence of second arcs may be used to determine the confidence score of the corresponding possible speech recognition result. A process for determining a possible speech recognition result may be regarded as a process for determining a next arc of an arc sequence. For example, assuming that a sequence of "今天是星期一" ("Today is Monday") arc has been found in the second scoring model, a next arc in the second scoring model may need to be found to get a new arc sequence (such as "Today is Monday night"). In some embodiments, when traversing the second scoring model, the processing device may access only second nodes and second arcs that meet a specific condition (e.g., nodes and arcs whose weights are higher than a certain threshold) to obtain the possible speech recognition results of the second scoring model and the corresponding first confidence score. In some embodiments, the traversal of the second scoring model may be performed in a variety of ways, for example, according to a depth-first traversal method or a breadth first traversal method. In some embodiments, the traversal method may be a recursive depth first-traversal method.

When traversing the second scoring model, the processing device may synchronously traverse the first scoring model. Specifically, for each of the plurality of possible speech recognition results, the processing device may determine a second confidence score of the possible speech recognition result based on the first scoring model. Further, the processing device may update the second scoring model based on the first confidence scores and the second confidence scores of the plurality of possible speech recognition results, and determine the re-scoring model based on the updated second scoring model.

In some embodiments, each possible speech recognition result may be represented as a sequence of at least one second arc in the second scoring model (referred to as a second arc sequence for brevity). For each of the plurality of possible speech recognition results, the processing device may determine a sequence of at least one first arc corresponding to the second arc sequence of the possible speech recognition result (referred to as the first arc sequence for short) in the first scoring model. The first arc(s) in the first arc sequence and the second arc(s) in the second arc sequence may output the same speech recognition result or similar speech recognition results.

In some embodiments, the output of the first arc sequence may be completely consistent with the output of the second arc sequence. If there is no arc sequence in the first scoring model that has an output completely consistent with the output of the second arc sequence, but there is an arc sequence in the first scoring model that has an output partially consistent with the second arc sequence, the processing device may perform a fallback operation and take an arc sequence with the minimum count of fallback steps in the first scoring model as the first arc sequence. The fallback operation may refer to removing, from the arc sequence whose output is partially consistent with the second arc sequence, one or more words from the front of the arc sequence to the back of the arc sequence or from the back to front. The count of fallback steps may refer to a count of times of removing words during fallback.

Figure 7:
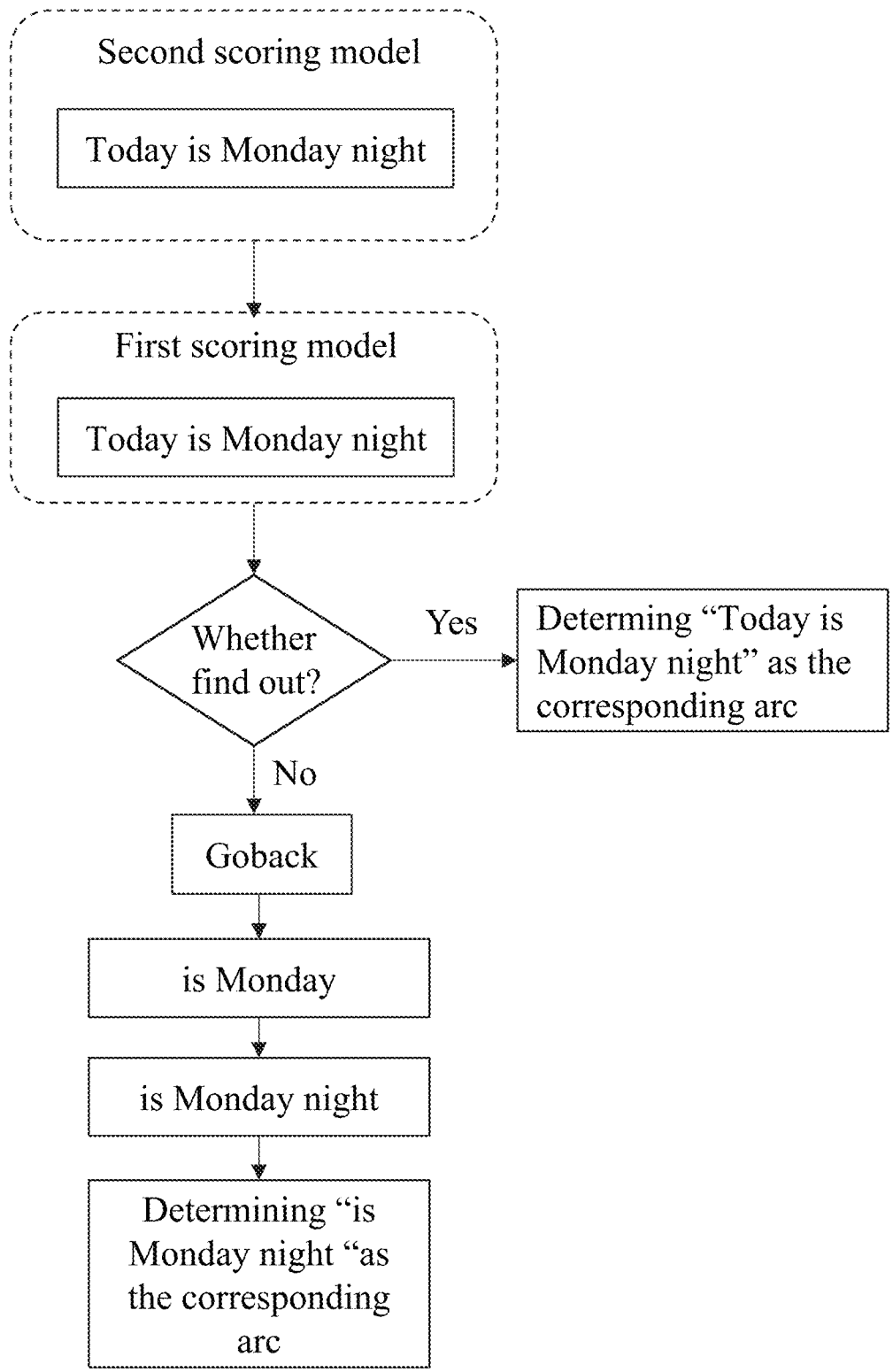
FIG. 7 is a schematic diagram illustrating an exemplary method for traversing according to some embodiments of the present disclosure.

For example, a schematic diagram of a process for determining a first arc sequence corresponding to a second arc sequence in the first scoring model is shown in FIG. 7. As shown in FIG. 7, the output of the second arc sequence obtained in the traversal of the second scoring model is "今天是星期一晚上" (Today is Monday night) (that is, a possible speech recognition result is "今天是星期 晚上"). If an output of a specific arc sequence completely consistent with the output of the second arc sequence is found in the first scoring model, that is, the output of the specific arc sequence is also "今天是星期一晚上" then the specific arc sequence in the first scoring model may be determined as the corresponding first arc sequence.

When there is no arc sequence having an output consistent with the output of the second arc sequence in the first scoring model, an arc sequence with the minimum count of fallback steps may be determined as the first arc sequence by the fallback operation. For example, as shown in FIG. 7, the second arc sequence in the second scoring model "今天是星期一晚上", only an arc sequence "今天是星期一" ("Today is Monday") is found in the first scoring model. When an arc sequence "今天是星期 晚上" is not found in the first scoring model, it is necessary to go back by one step to get an arc sequence "是星期一" (is Monday). Then an arc sequence "是星期一晚上" ("is Monday night") may need to be searched in the first scoring model. If the arc sequence of "是星期一晚上" is found in the first scoring model, the arc sequence may be determined as the first arc sequence corresponding to the second arc sequence. If the arc sequence of "是星期 晚上" is still not found in the first scoring model, then a fallback operation may be performed again (e.g., go back to "星期一" (Monday)) until a corresponding arc sequence is found.

After determining the first arc sequence corresponding to a possible speech recognition result, the processing device may determine the second confidence score of the possible speech recognition result based on the first arc sequence. Specifically, the processing device may determine the second confidence score of the possible speech recognition result based on the weights of first arcs in the first arc sequence. Further, the processing device may update the second scoring model based on the first confidence scores and second confidence scores of the possible speech recognition results. For example, for each possible speech recognition result, the processing device may use a difference between the first confidence score and the second confidence score of the possible speech recognition result, that is, a correction value, to replace the first confidence score of the second arc sequence corresponding to the possible speech recognition result in the second scoring model, and complete the update of the second scoring model. For another example, the processing device may store the first confidence score and the correction value of the second arc sequence corresponding to each possible speech recognition result in the second scoring model. That is, the updated second model may store the confidence correction value corresponding to each possible speech recognition result in the arc sequence. In some embodiments, the processing device may directly store the first confidence scores of the possible speech recognition results in the second scoring model. That is, the updated second scoring model may store the corrected confidence scores of the possible speech recognition results. In some embodiments of the present disclosure, the second scoring model may be updated using the differences or the corrected confidence scores, and the updated second scoring model may be determined as the re-scoring model, which may simplify the generation of the re-scoring model, reduce the complexity of score calculation in the process of re-scoring, improve the decoding speed, and reduce the occupation of memory resources.

In some embodiments, the first scoring model and the second scoring model may be traversed and updated in a specific order. For example, the first scoring model may be traversed synchronously while traversing the second scoring model, that is, while searching a second arc sequence in the second scoring model, the corresponding first arc sequence in the first scoring model may be searched and the second scoring model may be updated at the same time. For another example, after traversing the second scoring model and determining the possible speech recognition results, the corresponding first arc sequences may be determined by searching the first scoring model. After all the first arc sequences are determined, the second scoring model may be updated.

In some embodiments of the present disclosure, the first language model may be obtained by cropping the second language model, and only nodes and arcs with relatively higher importance in the second language model may be retained in the first language model. The decoding model may be generated based on the smaller first language model, which may have the advantages of occupying smaller memory resources and having faster decoding speed. However, because only a portion of nodes and arcs may be retained in the first language model, the accuracy of confidence score determination by the decoding model may be relatively low. The re-scoring model may be generated based on the larger second language model, which may include more arc sequences, and have the higher accuracy in re-scoring. In application, the decoding model may be used to decode and determine the candidate speech recognition results, and the re-scoring model may be used to re-score the candidate speech recognition results in real time. Thus, the accuracy and the speed of decoding speed may be improved. On the other hand, by cropping the second language model, the states and arcs with high scores may be saved as the first language model, which may reduce the amount of decoding calculation, that is, there may be no need to train an extra language model as the first language model.

In some embodiments, during the process for generating the re-scoring model, the corresponding relationship between the arc sequences in the first scoring model and the arc sequences in the second scoring model may be determined. When the re-scoring model is applied for on-the-fly rescoring, the arc sequence and confidence correction value corresponding to a candidate speech recognition result of the decoding model (which is generated based on the first scoring model) may be quickly searched out in the re-scoring model (which is updated based on the second scoring model), which may improve the efficiency of decoding.

Figure 8:
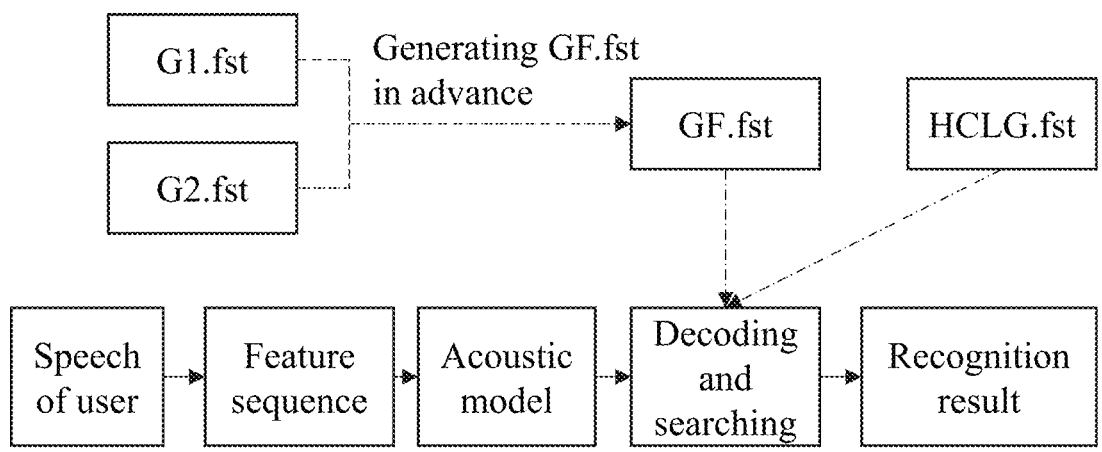
FIG. 8 is a schematic diagram illustrating an exemplary method for on-the-fly rescoring in speech recognition according to some embodiments of the present disclosure.

FIG. 8 is a schematic diagram illustrating an exemplary method for on-the-fly rescoring in speech recognition according to some embodiments of the present disclosure.

As shown in FIG. 8, the processing device may generate a feature sequence based on a speech of the user, and then process the feature sequence using an acoustic model to obtain the probability that each phoneme or vowel is included in each speech frame. The processing device may decode and search based on the probability that each phoneme or vowel is included in each speech frame, and then the speech recognition result may be obtained. In a process of decoding and searching, a re-scoring model GF.fst and a decoding model HCLG.fst may be utilized.

In some embodiments, the re-scoring model GF.fst may be generated in advance using a first scoring model G1.fst and a second scoring model G2.fst. For each possible speech recognition result in the first scoring model G1.fst, the re-scoring model GF.fst may save a difference between a second confidence score of the possible speech recognition result in the first scoring model G1.fst and a first confidence score of the possible speech recognition result in the second scoring model G2.fst. For example, a second confidence score of a possible speech recognition result in the first scoring model G1.fst is 0.6, and a first confidence score in the second scoring model G2.fst is 0.63, the re-scoring model GF.fst may store a difference of 0.03 between the second confidence score and the first confidence score. When the speech recognition result is in on-the-fly rescoring, the processing device may obtain a speech recognition result and an initial confidence score obtained by the decoding model HCLG.fst, obtain a score corresponding to the speech recognition result (i.e., the difference) from the re-scoring model GF.fst, and obtain a final confidence score of the speech recognition result based on the initial confidence score and the difference.

In some embodiments of the present disclosure, re-scoring the speech recognition result of the decoding model using the re-scoring model may improve the decoding speed. Originally, a great amount of calculation may need to be performed in the first scoring model G1.fst and the second scoring model G2.fst at the same time, now only an operation of searching may need to be performed in the re-scoring model GF.fst without calculation, which may improve the decoding speed. Further, a count of decoding networks and the saved intermediate variables may be reduced, which may reduce the memory occupation.

Figure 9:
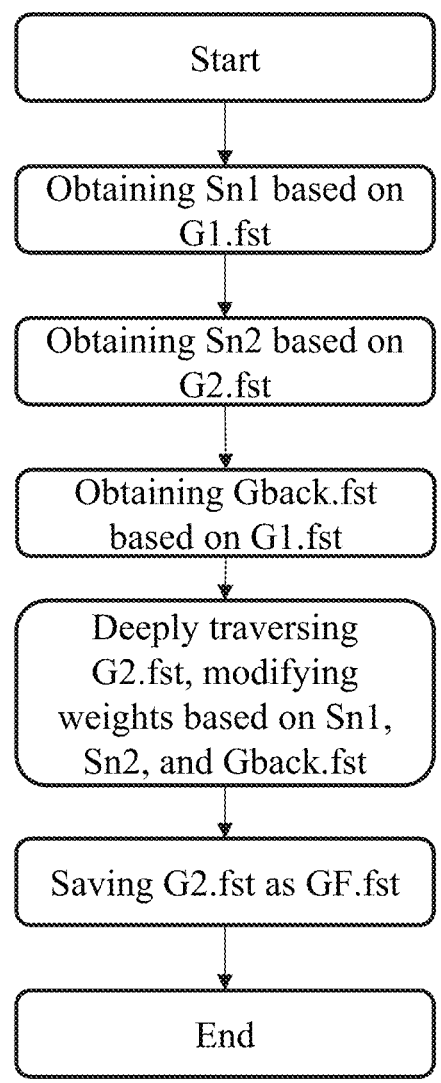
FIG. 9 is a flowchart illustrating an exemplary method for generating a re-scoring model according to some embodiments of the present disclosure.

FIG. 9 is a flowchart illustrating an exemplary method for generating a re-scoring model according to some embodiments of the present disclosure.

In some embodiments, each state in the first scoring model G1.fst and the second scoring model G2.fst may have an additional attribute (e.g., a count of order). The additional attribute may not be directly stored in data structure of the first scoring model G1.fst or the second scoring model G2.fst, and may be an independent attribute. As shown in FIG. 9, in some embodiments, an N-Gram order of each state in the first scoring model G1.fst and the second scoring model G2.fst may be obtained by statistical methods, and be saved in Sn1 and Sn2, respectively.

As shown in FIG. 9, in some embodiments, a fallback model Gback.fst may be built based on the first scoring model G1.fst. The first scoring model G1.fst may include several arcs having their respective acceptable inputs. When one of the inputs is determined, a weight may be returned and a next state may be converted to. If the determined input is not within an acceptable range of the several arcs, an error may be returned. The fallback model Gback.fst may extend the first model G1.fst, and accept any input, and this function may be based on an assumption that if an input is not in the acceptable range of the several arcs, an arc that can accept the input after fallback may be found through several fallback operations. The fallback model Gback.fst may allow continuous fallback operations until a satisfactory arc is found. A sum of the returned weights and a weight of the satisfactory arc may be returned as a weight score of a final arc, a next state of the final arc may be converted to.

As shown in FIG. 9, in some embodiments, when traversing the second scoring model G2.fst, the Sn1, the SN2 and the fallback model Gback.fst may be used to modify the weights of the arcs in the second scoring model, and the second scoring model G2.fst with modified weights of the arcs may be saved as the re-scoring model GF.fst.

In some embodiments, before traversing the second scoring model G2.fst, an initial state of the second scoring model G2.fst and an initial state of the fallback model Gback.fst may be obtained, and the two initial states may be used as input parameters to perform a recursive depth traversal. The initial state of a finite-state transducer may refer to a state in which the nodes of the finite-state transducer are in their initial states, and the traversing of the finite-state transducer may start from the initial state of the finite-state transducer. In a recursive function, it may be determined that whether a state (a state corresponding to a node) of the second scoring model G2.fst has been processed. If the state has been processed, the processing of the state may be finished. If not, all arcs in the state may be traversed and the weights of all arcs may be updated. There may be three situations. In the first situation, if an input on the arc is not 0, a speech recognition result may be output. At this time, assuming that the weight of the arc is w2, and a weight corresponding to the input may need to be searched in the fallback model Gback.fst to obtain w1. A difference between w2 and w1 may be saved with the arc. At the same time, a next state of the arc and a next state searched in the fallback model Gback.fst may be used as input parameters to be invoked in recursion. In the second situation, if the input on the arc is 0, but attributes of the two initial states are consistent (judged by Sn1 and Sn2), then both the states may need to perform the fallback operation. An operation similar to the operation in the first situation may be performed, that is, modifying the weight and invoking next states of the second scoring model G2.fst and the fallback model Gback.fst in recursion. In the third situation, the input on the arc is 0 and the attributes of the states are inconsistent. At this time, a fallback operation may only need to be performed on the second scoring model G2.fst, and then be invoked in recursion.

The re-scoring model GF.fst may be used in speech recognition. In some embodiments, in a process of decoding by using the decoding model HCLG.fst, an arc sequence (also known as decoding path) corresponding to the decoding result of the speech data may be determined. For each arc in the arc sequence, an additional space may be opened to save a state value and save the corresponding state of the re-scoring model GF.fst. When a word is output on the decoding path, that is, the output on the arc is not 0, the corresponding weight may be obtained from the re-scoring model GF.fst, the weight may be added to the decoding path, and the state of the re-scoring model GF.fst may be updated.

Figure 10:
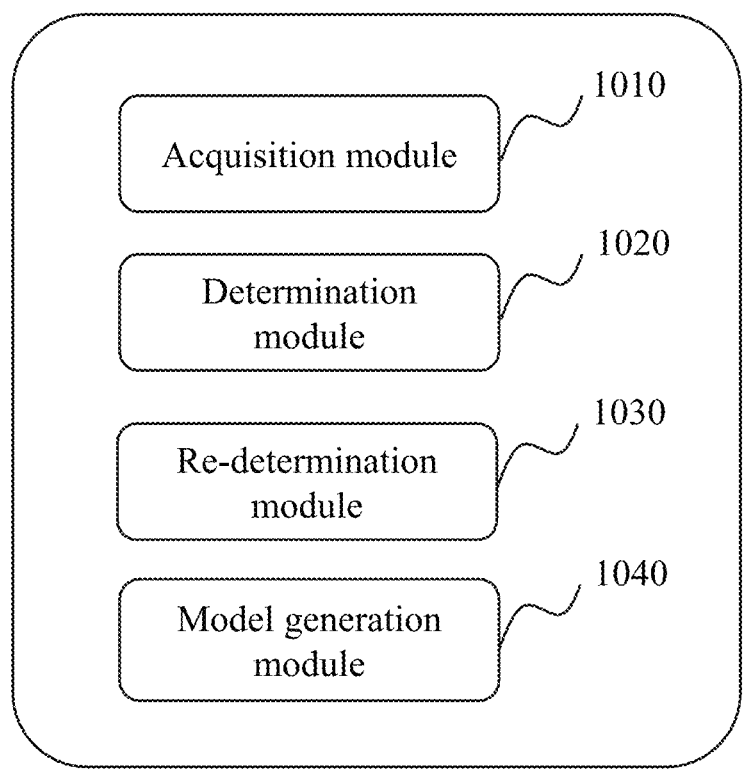
FIG. 10 is a block diagram illustrating an exemplary method for speech recognition according to some embodiments of the present disclosure.

FIG. 10 is a block diagram illustrating an exemplary speech recognition system 1000 according to some embodiments of the present disclosure. As shown in FIG. 10, the speech recognition system 1000 may include an acquisition module 1010, a determination module 1020, a re-determination module 1030, and a model generation module 1040.

The acquisition module 1010 may be configured to obtain data relating to the speech recognition system 100. For example, the acquisition module 1010 may obtain speech data and a speech recognition result of the speech data. The speech data may include speech of a plurality of speakers, and the speech recognition result may include a plurality of words.

The determination module 1020 may be configured to determine speaking time of each of the plurality of speakers by processing the speech data. More descriptions regarding the determination of the speaking time may be found elsewhere in the present disclosure. See, e.g., operation 220 and relevant descriptions thereof. In some embodiments, the determination module 1020 may be configured to determine a corresponding relationship between the plurality of words and the plurality of speakers based on the speaking times of the plurality of speakers and the speech recognition result. More descriptions regarding the determination of the corresponding relationship may be found elsewhere in the present disclosure. See, e.g., operation 230 and relevant descriptions thereof. In some embodiments, the determination module 1020 may be configured to determine at least one conversion word from the plurality of words based on the corresponding relationship, wherein each of the at least one conversion word may correspond to at least two of the plurality of speakers. More descriptions regarding the determination of the at least one conversion word may be found elsewhere in the present disclosure. See, e.g., operation 240 and relevant descriptions thereof.

In some embodiments, the determination module 1010 may be configured to determine feature information of the speech data. Based on the feature information, the determination module 1020 may also be configured to determine a plurality of candidate speech recognition results and a confidence score of each of the plurality of candidate speech recognition results using a decoding model and a re-scoring model. Further, the determination module 1020 may determine a speech recognition result from the plurality of candidate speech recognition results based on the confidence scores of the plurality of candidate speech recognition results. More descriptions regarding the determination of the speech recognition result may be found elsewhere in the present disclosure. See, e.g., FIG. 4 and relevant descriptions thereof.

The re-determination module 1030 may be configured to re-determine the corresponding relationship between the plurality of words and the plurality of speakers based on the at least one conversion word. More descriptions regarding the re-determination of the corresponding relationship may be found elsewhere in the present disclosure. See, e.g., operation 250 and relevant descriptions thereof.

The model generation module 1040 may be configured to obtain or generate one or more models for speech recognition, for example, a first language model, a second language model, a decoding model, a first scoring model, a second scoring model, a re-scoring model, or the like, or any combination thereof. More descriptions regarding the model(s) for speech recognition may be found elsewhere in the present disclosure. See, e.g., FIGS. 4 and 5 and relevant descriptions thereof.

It should be noted that various modules illustrated in FIG. 10 may be implemented via various ways. For example, the modules may be implemented through hardware, software, or a combination thereof. Herein, the hardware may be implemented by a dedicated logic; the software may be stored in the storage, and may be executed by proper instruction executing system (e.g., a microprocessor or a dedicated design hardware). Those skilled in the art can understand that, the processing device and modules described in this disclosure may be implemented by the executable instructions of a computer. The systems and the modules in the present disclosure may be implemented not only by hardware circuits such as the very large scale integration circuit or the gate array, the semiconductors such as the logic chips and the transistors, or the programmable hardware devices such as the field programmable gate array and the programmable logic devices, but also by a software performed by various processors, or a combination thereof (e.g., firmware).

It should be noted that above description about the speech recognition system 100 and the modules is merely provided for convenience of description, and is not intended to limit the scope of the present disclosure. It could be understood that for those skilled in the art, after understanding the principle of the system, it is possible to arbitrarily combine various components, or form subcomponents to connect with other components without departing from this principle. For example, as shown in FIG. 10, the acquisition module 1010, the determination module 1020, the re-determination module 1030 and the model generation module 1040 may be different modules in one device, or one module may implement the functions of the above two or more modules. For another example, each module in the speech recognition system 1000 may share a storage module, and each module may also have its own storage unit. For another example, the acquisition module 1010 may be a separate component rather than a module within the speech recognition system 1000. For another example, the model generation module 1040 may be a module of other systems. Such deformation is within the scope of the present disclosure.

The possible beneficial effects of the embodiment of the present disclosure may include, but may not be limited to: (1) the technology for distinguishing speaks in the present disclosure may use speech recognition technology and voiceprint feature extraction technology, which may avoid a problem of that the speech recognition result omitted or assigned to a wrong speaker and improve the accuracy and efficiency of distinguishing speakers; (2) by recognizing and re-determining the conversion word in the speech recognition result, the accuracy and reliability of the speech recognition result may be improved; (3) by preprocessing (e.g., removing noise and/or mute segments) the speech data to obtain the effective speech segment and analyzing the effective speech segment, the amount of data processed by speech analysis may be reduced, and the efficiency and accuracy of distinguishing speakers in speech recognition may be improved; (4) by using the re-scoring model to rescore the candidate speech recognition results of the decoding model, the analysis and calculation required for decoding may be reduced, and the computing resources required for decoding may be reduced; (5) the re-scoring model may store the correction value of the confidence score or the updated confidence score, which may directly search the re-scoring model without calculation, or a re-scoring operation may be performed through simple calculation, reduce the complexity of score calculation in the process of re-scoring and improve the decoding speed.

It should be noted that different embodiments may have different beneficial effects. In different embodiments, the possible beneficial effects may be any one or a combination of the above, or any other possible beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should consider specified significant digits and adopt ordinary rounding techniques. Notwithstanding that the numerical ranges and parameters configured to illustrate the broad scope of some embodiments of the present disclosure are approximations, the numerical values in specific examples may be as accurate as possible within a practical scope.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A speech recognition system, comprising:
  at least one storage device storing a set of instructions; and
  at least one processor in communication with the at least one storage device, wherein when executing the set of instructions, the at least one processor is configured to cause the system to perform operations including:
    obtaining speech data, the speech data including speech of a plurality of speakers;
    determining feature information of the speech data;
    obtaining a plurality of candidate speech recognition results and an initial confidence score of each of the plurality of candidate speech recognition results by processing the feature information using a decoding model;
    for each of the plurality of candidate speech recognition results,
      determining a correction value of the candidate speech recognition result using a re-scoring model; and
      determining the confidence score of the candidate speech recognition result by summing the initial confidence score and the correction value of the candidate speech recognition result; and
    determining a speech recognition result from the plurality of candidate speech recognition results based on the confidence scores of the plurality of candidate speech recognition results, the speech recognition result including a plurality of words, wherein the re-scoring model is generated based on a process of training model, the process of training model including:

obtaining a first language model and a second language model, and the first language model being obtained by cropping the second language model;
generating the decoding model based on the first language model;
generating a first scoring model and a second scoring model based on the first language model and the second language model; and
obtaining the re-scoring model based on the first scoring model and the second scoring model, wherein the obtaining the re-scoring model based on the first scoring model and the second scoring model includes:
  obtaining a plurality of possible speech recognition results and a first confidence score of each of the plurality of possible speech recognition results by traversing the second scoring model;
  for each of the plurality of possible speech recognition results, determining a second confidence score of the possible speech recognition result based on the first scoring model;
  updating the second scoring model based on the first confidence scores and the second confidence scores of the plurality of possible speech recognition results; and
  determining the re-scoring model based on the updated second scoring model.

2. The system of claim 1, the operations further comprising:
determining speaking time of each of the plurality of speakers by processing the speech data;
determining, based on the speaking times of the plurality of speakers and the speech recognition result, a corresponding relationship between the plurality of words and the plurality of speakers;
determining, based on the corresponding relationship, at least one conversion word from the plurality of words, each of the at least one conversion word corresponding to at least two of the plurality of speakers; and
re-determining the corresponding relationship between the plurality of words and the plurality of speakers based on the at least one conversion word.

3. The system of claim 2, wherein the re-determining the corresponding relationship between the plurality of words and the plurality of speakers based on the at least one conversion word includes:
for each of the at least one conversion word, determining a speaker corresponding to the conversion word based on a time interval between the conversion word and at least one adjacent word of the conversion word.

4. The system of claim 3, wherein the determining a speaker corresponding to the conversion word based on a time interval between the conversion word and at least one adjacent word of the conversion word includes:
determining a target adjacent word from the at least one adjacent word of the conversion word, the time interval between the adjacent word and the conversion words being less than a preset length of time, and the target adjacent word not being the conversion word; and
determining the speaker corresponding to the conversion word based on the target adjacent word.

5. The system of claim 2, wherein the re-determining the corresponding relationship between the plurality of words and the plurality of speakers based on the at least one conversion word includes:
obtaining voiceprint feature information of each of the plurality of speakers; and
for each of the at least one conversion word, determining the speaker corresponding to the conversion word based on the voiceprint feature information of the plurality of speakers and voiceprint feature information of a target speech segment, the target speech segment including the conversion word.

6. The system of claim 2, wherein the determining speaking time of each of the plurality of speakers by processing the speech data includes:
generating at least one effective speech segment including speech content by preprocessing the speech data; and
determining the speaking time of each of the plurality of speakers by processing the at least one effective speech segment.

7. The system of claim 6, wherein the generating at least one effective speech segment including speech content by preprocessing the speech data includes:
obtaining a plurality of first speech segments by processing the speech data based on the speech recognition result;
obtaining a plurality of second speech segments by amplifying the plurality of first speech segments; and
obtaining the at least one effective speech segment by performing a processing operation on the plurality of second speech segments, the processing operation including at least one of a merging operation or a segmentation operation.

8. The system of claim 6, wherein the determining the speaking time of each of the plurality of speakers by processing the at least one effective speech segment includes:
extracting a voiceprint feature vector of each of the at least one effective speech segment; and
determining the speaking time of each of the plurality of speakers by clustering the voiceprint feature vector of the at least one effective speech segment.

9. The system of claim 1, wherein the first scoring model includes a plurality of first arcs, the second scoring model includes a plurality of second arcs, and the each of the plurality of possible speech recognition results is represented by a sequence of at least one second arc, and
for each of the plurality of possible speech recognition results, the determining a second confidence score of the possible speech recognition result based on the first scoring model includes:
for the each of the plurality of possible speech recognition results,
  determining, in the first scoring model, a sequence of at least one first arc corresponding to the sequence of at least one second arc of the possible speech recognition result; and
  determining the second confidence score of the possible speech recognition result based on the sequence of at least one first arc.

10. The system of claim 1, wherein
the decoding model has a directed graph structure including a plurality of arcs, each arc having a weight,
each candidate speech recognition result is represented by a set of arcs in the decoding model, and
the confidence score of each candidate speech recognition result is determined based on the weights of the set of arcs corresponding to the candidate speech recognition result.

11. The system of claim 10, wherein
the re-scoring model has a second directed graph structure including a plurality of second arcs, each second arc having a second weight, the determining a correction value of the candidate speech recognition result using a re-scoring model comprises:
    determining, from the plurality of second arcs in the re-scoring model, a second set of arcs corresponding to the set of arcs of the candidate speech recognition result; and
    determining the correction value of the candidate speech recognition result based on the second weights of the plurality of second arcs.

12. A non-transitory computer readable medium, comprising executable instructions that, when executed by at least one processor, directs the at least one processor to perform a speech recognition method, the method comprising:
    obtaining speech data, the speech data including speech of a plurality of speakers;
    determining feature information of the speech data;
    obtaining a plurality of candidate speech recognition results and an initial confidence score of each of the plurality of candidate speech recognition results by processing the feature information using a decoding model;
    for each of the plurality of candidate speech recognition results,
        determining a correction value of the candidate speech recognition result using a re-scoring model; and
        determining the confidence score of the candidate speech recognition result by summing the initial confidence score and the correction value of the candidate speech recognition result; and
    determining a speech recognition result from the plurality of candidate speech recognition results based on the confidence scores of the plurality of candidate speech recognition results, the speech recognition result including a plurality of words, wherein the re-scoring model is generated based on a process of training model, the process of training model including:
    obtaining a first language model and a second language model, and the first language model being obtained by cropping the second language model;
    generating the decoding model based on the first language model;
    generating a first scoring model and a second scoring model based on the first language model and the second language model; and
    obtaining the re-scoring model based on the first scoring model and the second scoring model, wherein the obtaining the re-scoring model based on the first scoring model and the second scoring model includes:
        obtaining a plurality of possible speech recognition results and a first confidence score of each of the plurality of possible speech recognition results by traversing the second scoring model;
        for each of the plurality of possible speech recognition results, determining a second confidence score of the possible speech recognition result based on the first scoring model;
        updating the second scoring model based on the first confidence scores and the second confidence scores of the plurality of possible speech recognition results; and
        determining the re-scoring model based on the updated second scoring model.

* * * * *